(12) United States Patent
Amari et al.

(10) Patent No.: US 6,603,083 B2
(45) Date of Patent: *Aug. 5, 2003

(54) PUSH SWITCH STRUCTURE FOR DISPLAY

(75) Inventors: Takeyuki Amari, Shizuoka (JP);
Yoshiyuki Furuya, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/512,658

(22) Filed: Feb. 24, 2000

(65) Prior Publication Data
US 2002/0056614 A1 May 16, 2002

(30) Foreign Application Priority Data

Feb. 26, 1999 (JP) .......................................... 11-049690
May 28, 1999 (JP) .......................................... 11-149295

(51) Int. Cl.⁷ ................................................. H01H 9/26
(52) U.S. Cl. ...................... 200/5 D; 200/302.2; 200/314
(58) Field of Search ............................. 200/5 D, 329, 200/333, 341, 518, 519, 520, 512, 510, 314, 302.2; 345/168, 170, 171, 172, 173; 178/18.01, 18.1

(56) References Cited

U.S. PATENT DOCUMENTS

| | | | | |
|---|---|---|---|---|
| 3,978,297 A | * | 8/1976 | Lynn et al. ................. | 200/5 A |
| 4,315,114 A | * | 2/1982 | Monti, Jr. ................... | 200/5 A |
| 4,501,937 A | * | 2/1985 | Anderson et al. ........... | 200/5 A |
| 4,825,023 A | * | 4/1989 | Morse ....................... | 200/302.2 |
| 4,843,197 A | * | 6/1989 | Kojima et al. .............. | 200/406 |
| 5,258,592 A | * | 11/1993 | Nishikawa et al. ....... | 200/302.2 |
| 5,266,949 A | * | 11/1993 | Rossi ......................... | 341/22 |
| 5,313,027 A | * | 5/1994 | Inoue et al. ................ | 200/5 A |
| 5,413,358 A | * | 5/1995 | Austin, Jr. et al. ........... | 277/12 |
| 5,668,357 A | * | 9/1997 | Takiguchi et al. .......... | 200/5 A |
| 5,927,483 A | * | 7/1999 | Yamada ...................... | 200/343 |
| 5,950,808 A | * | 9/1999 | Tanabe et al. ............. | 200/314 |

* cited by examiner

Primary Examiner—Elvin Enad
Assistant Examiner—Lisa N. Klaus
(74) Attorney, Agent, or Firm—Armstrong, Westerman & Hattori, LLP

(57) ABSTRACT

A push switch structure for a display is provided, wherein the elastic sealing member 84 adheres to the periphery of the key switch body 83 for transmitting indication of the display 78. The key switch body is inserted into the opening portion of the elastic sealing member and the collar portion of the key switch body coheres to the elastic sealing member and is pressed with the cover. The key switch body is provided with the accommodating recess for a push-button switch 99. The key switch body is provided with the transparent electrode and the elastic sealing member coheres to the transparent electrode substrate arranged on the front of the display. An assembled unit 76 of the elastic sealing member and the key switch body is assembled to the display case 77, which is assembled to an assembly 96 of the control substrate 79 and the display. The elastic sealing member coheres to the front of the accommodating portion 87 and the display is put into close contact with the backside of the accommodating portion 87, and a part of the elastic sealing member is formed in a sector-shape between the key switch bodies and is bent to form the resilient portion. Thus, dust-and-waterproofing of the push switch for the display can be obtained.

17 Claims, 18 Drawing Sheets

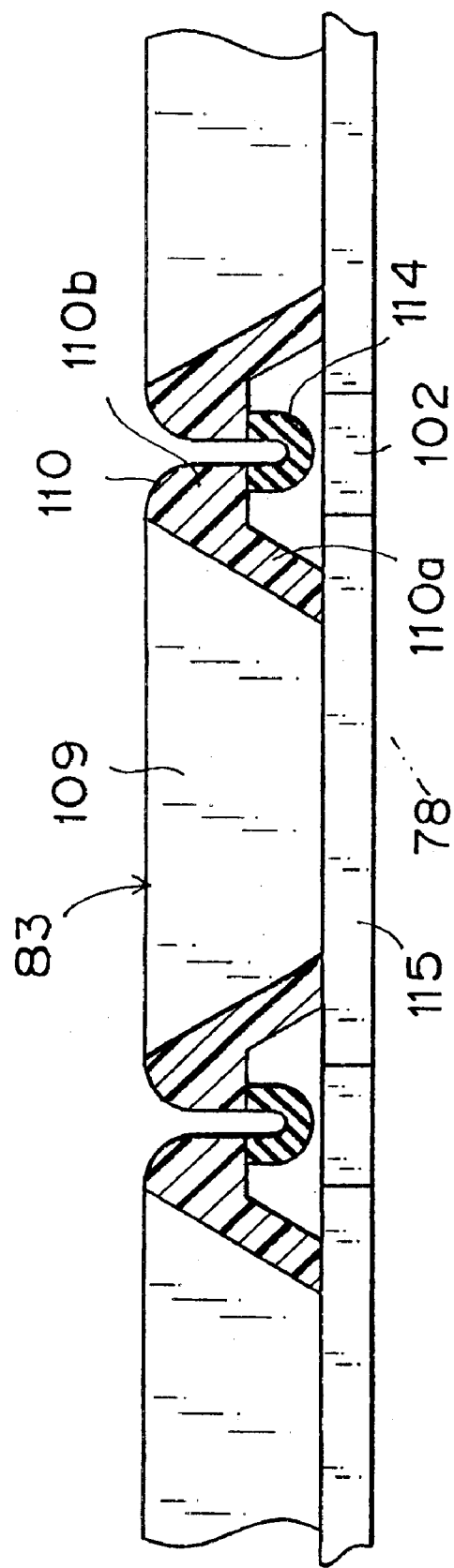

PUSH SWITCH STRUCTURE FOR DISPLAY

BACKGROUND OF THE INVENTION

1. Field of the Invention

The present invention generally relates to a display-transmissible push switch structure and, more particularly, to a display-transmissible push switch structure to operate equipment such as an audio system and an air conditioning system of a motor vehicle, wherein a key switch body of synthetic resin is integrally provided with an elastic sealing member of such a rubber on the circumference thereof to improve a dust and water proofing property.

2. Description of the Related Art

FIG. 20 shows an arrangement of push-type key switch bodies 127–129 and a display 130 on a center cluster 126 of a dashboard 125 of a motor vehicle.

The key switch bodies 127–129 are arranged around the display 130. With the key switch bodies 127–129, equipment such as an air conditioner and an audio system operates, is adjusted, or is selected, and for example, shift of volume and sound quality of the audio system, shift of air quantity and blowing-out position of the air conditioner, selection of a radio station, and the like are carried out. The key switch bodes 127–129 and the display 130 are assembled onto the center cluster 126 as a switch structure body (i.e., switch module).

FIG. 21 is a front view showing a conventional push switch structure. The key switch bodies 127–129 are classified into two types. The one is the key switch body 127 on which characters showing mode, function, or the like are directly printed. The other type is of transmissible key switch bodies 128, 129 capable of transmitting indication of the display 130, which key switch bodies are arranged in parallel to a display surface of the display 130.

A whole area 130a of the display 130 is larger than the display window 135 of a front cover 134 made of synthetic resin, and the transmissible key switch bodies 128, 129 are arranged on a side end and a bottom end of the display (i.e., displaying area) 130, respectively. The key switch body 128 at the side end indicates such a channel or frequency of the radio station, and the key switch body 129 at the bottom end indicates such an air quantity or a blowing-out direction of the air conditioner.

FIG. 22 is a perspective view showing the push switch structure of FIG. 21.

In FIG. 22, 134 is the front cover made of synthetic resin, 127–129 are the key switch bodies, 130 is the display, 136 is a control substrate, and 137 indicates a metal casing.

The key switch bodies 127–129, a through hole 139 for an adjusting knob 138, a display window 140 for the display 130, an inserting portion 141 for a cassette tape recorder or CD (i.e., compact disc memory) are provided in the front cover 134. The transmissible key switch bodies 128, 129 are arranged on the front side of the display 130, and the letter—letter-printed key switch body 127 is arranged outside the display 130.

The display 130 is assembled onto the control substrate 136, on which a push-button switch (a microswitch) 141 a for the letter—letter-printed key switch body 127 is provided. The transmissible key switch body 128 is fixed to the front cover 134 in a state of being assembled onto a small electrode substrate 142. An indicating means such as LCD (i.e., liquid crystal display) and ELD (i.e., electroluminescent display) is used for the display 130.

Equipment 143 (not specifically illustrated) such as CD (i.e., compact disc memory) and a cassette tape recorder is arranged in the casing 137, and an assembly 144 of the display 130 and the control substrate 135, the key switch bodies 127–129, and the front cover 134 are fixed to the front side of the casing 137. The casing is fixed to the vehicle body (i.e., the backside of the center cluster 126 of FIG. 23) by a bracket 145.

FIG. 23 is a perspective view showing a main portion, i.e., an assemblage structure of the transmissible key switch body 128, of the push switch structure of FIG. 21. The key switch bodies 129 are connected to a thin plate-like fixing plate 147 through an elastic portion 146. The key switch bodies 128 are assembled onto an electrode substrate 142. Openings 148 for the key switch bodies 128 are provided on the electrode substrate 142.

A fixing plate 147 is positioned by a projecting portion 149 of the electrode substrate 142. The key switch bodies 128 are supported in a cantilevered state. The other end of the key switch body 128 is put into contact with a push-button switch 150 on the electrode substrate. By pushing the key switch body 128, the push-button switch 150 is pushed, and a contact point of the electrode substrate 142 is connected. A spring (not illustrated) for restoration is built in the push-button switch 150, and a clicking-feel at switch-operation is exhibited by means of spring-force.

The electrode substrate 142 is connected to the control substrate 130 (FIG. 18) on a side of the display with connectors 151, 152. The center side of the key switch body 128 is formed out of a transparent resin member and the circumference is surrounded with a opaque resin member, whereby light leak and transmission of indication from the neighboring key switch body 128 are prevented.

Since indication of the display 130 transmits the key switch body 128, various kinds of indications are obtained with one switch, whereby reduction of switch is attained. And, by using the thin elastic portion 146 as a hinge of the key switch body 128, thin-modeling of the switch is attained.

With respect to the above conventional structure, however, dust or water invades the inside of the key switch body, which could cause poor contact of switch and a fog of an inner surface of the key switch body, and indication of the transmissible key switch body would get unvisible in a dusty, humid, rainy, or badly temperature-changing atmosphere, or a fitting work of switch, for example. Also, there would be a limitation in thinning the structure of switch.

SUMMARY OF THE INVENTION

In view of the foregoing, an object of the present invention is to provide a push switch structure, wherein water-and-dust proofing property of a push switch is improved and therefore deterioration of visibility of a transmissible switch displaying portion is dissolved and wherein the push switch is thinner and downsized, can securely be water-and-dustproofing, can be smoothly securely operated, and further is of low cost.

To achieve the above object, as a first aspect of the present invention, a push switch structure for a display includes: a key switch body capable of transmitting indication of the display; and an elastic sealing member adhering to a circumference of the key switch body so as to seal the key switch body.

As a second aspect of the present invention, in the structure with the above first aspect, the push switch structure further includes: an electrode substrate, wherein the key switch body has a transmissible portion and a non-transmissible portion and an elastic contact to electrically come into contact with the electrode substrate is provided in the non-transmissible portion.

As a third aspect of the present invention, in the structure with the above second aspect, the metal contact is provided in one non-transmissible portion of the key switch body and a hinge is provided in the other non-transmissible portion of the key switch body.

As a fourth aspect of the present invention, in the structure with the above second aspect, the non-transmissible portion is formed with the elastic sealing member and the elastic sealing member is supported by the metal contact.

As a fifth aspect of the present invention, a push switch structure for a display includes: a key switch body capable of transmitting indication of the display and having a collar portion; an elastic sealing member having an opening portion to receive the key switch body; and a cover to push the collar portion of the key switch body toward the elastic sealing member so that the collar portion coheres to the elastic sealing member.

As a sixth aspect of the present invention, in the structure with the above fifth aspect, the elastic sealing member also has a collar portion and the collar portion of the key switch body coheres to the collar portion of the elastic sealing member.

As a seventh aspect of the present invention, in the structure with the above fifth aspect, the key switch body coheres to an inner surface of the opening portion.

As an eighth aspect of the present invention, in the structure with the above fifth aspect, the key switch body has a displaying portion and an engaging portion formed narrower than the displaying portion, the engaging portion being inserted into the opening portion of the elastic sealing member.

As a ninth aspect of the present invention, in the structure with the above fifth aspect, the push switch structure further includes: a base member to be arranged between the elastic sealing member and the display, wherein a peripheral portion of the elastic sealing member is tightly put between the cover and the base member.

As a tenth aspect of the present invention, in the structure with the above fifth aspect, the push switch structure further includes: a push-button switch, wherein an accommodating recess for accommodating the push-button switch is provided on the key switch body.

As an eleventh aspect of the present invention, in the structure with the above tenth aspect, the key switch body has a displaying portion and an engaging portion, the engaging portion being inserted into the opening portion of the elastic sealing member and being formed to cover a circumference of the displaying portion and the accommodating recess.

As a twelfth aspect of the present invention, in the structure with the above eleventh aspect, the collar portion, the engaging portion, and the accommodating recess are made of a non-transmissible material.

As a thirteenth aspect of the present invention, in the structure with the above first or fifth aspect, a transparent electrode substrate is arranged on a surface of the display and a transparent electrode to be electrically connected with the transparent electrode substrate is provided on the key switch body.

As a fourteenth aspect of the present invention, in the structure with the above thirteenth aspect, the base portion of the elastic sealing member coheres to the transparent electrode substrate.

As a fifteenth aspect of the present invention, in the structure with the above first or fifth aspect, the push switch structure further includes: a display case to mount an assembled unit of the elastic sealing member and the key switch body; and a control substrate to mount the display, wherein the display case is mounted onto an assembly of the control substrate and the display.

As a sixteenth aspect of the present invention, in the structure with the above fifteenth aspect, the display case has an accommodating portion for accommodating the assembled unit, and the base portion of the elastic sealing member coheres to a front of the accommodating portion and the display coheres to a back of the accommodating portion.

As a seventeenth aspect of the present invention, in the structure with the above fifteenth or sixteenth aspect, a desiccant is provided inside the display case.

As an eighteenth aspect of the present invention, in the structure with any one of the above first to fourth, thirteenth, fourteenth, fifteenth, and sixteenth aspects, a sector portion is provided on the elastic sealing member between the key switch bodies and a resilient portion is formed by bending the sector portion.

According to the above-described structures of the present invention, the following advantages are provided, respectively.

(1) Because the inside of the key switch body is dust-and-waterproofed securely by the elastic sealing member, poor contact and a fog of the inner surface of the key switch body caused by inroad of water, dust, or the like are prevented, thereby improving visibility of indication of the switch. And, adhering work of the elastic sealing member and the key switch body can be carried out by means of integral molding or adhesion effectively.

(2) The metal contact and the electrode substrate are dust-and-waterproofed securely by the elastic sealing member. And, the clicking-feel at switch-operation is enhanced by means of the elastic metal contact. Also, because the metal contact is arranged inside the non-transmissible portion of the key switch body, visibility of indication is secured and simultaneously space is utilized effectively, thereby downsizing the structure.

(3) Space is utilized effectively, and simultaneously the clicking-feel at switch-operation is obtained securely, because the key switch body is cantilevered.

(4) Because shape of the elastic sealing member is maintained by the metal contact and because the elastic sealing member serves as one part of the key switch body, two-color molding of the key switch body out of synthetic resin materials becomes unnecessary, thereby reducing costs.

(5) Because the elastic sealing member coheres to the collar portion of the key switch body by the reaction force strongly, secure sealing is exhibited. And, because the inside of the key switch body is dust-and-waterproofed securely by the elastic sealing member, poor contact and a fog of the inner surface of the key switch body caused by inroad of water, dust, or the like are prevented, thereby improving visibility of indication of the switch. Further, because the key switch body and the elastic sealing member need not adhere, major device is not required, thereby reducing manufacturing cost. And also this structure can be applied to the elastic sealing member and the key switch body each, for example, having a complicated shape with difficult in adhesion.

(6) Because the collar portions of the respective key switch body and elastic sealing member are put into surface-contact with each other, sealing characteristic enhances due to a large adhering area and secure sealing is attained even if the key switch body is pushed obliquely.

(7) Because the key switch body coheres to the inner surface of the opening portion of the elastic sealing member, reaction force of the elastic sealing member acts on the key switch body side stable, thereby further improving the sealing characteristic.

(8) Because a dead space portion is utilized as an adhering portion of the elastic sealing member, downsizing of the structure is attained.

(9) The base portion side of the elastic sealing member is sealed simply securely with the base member and the cover.

(10) Because the push-button switch is accommodated inside the accommodating recess of the key switch body, the push-button switch can be dust-and-waterproofed and thin-modeling of the structure is attained.

(11) The opening portion of the elastic sealing member engages the engaging portion at the outside of the accommodating recess and also the push-button switch is positioned inside the elastic sealing member, the push-button switch can be securely dust-and-waterproofed.

(12) Because transmission of indication for an adjacent switch and light leak of the display from the opening portion are prevented by a non-transmissible member, visibility is improved.

(13) The switch structure is thinned by means of the transparent electrode substrate and of the thin transparent electrode. And, because an existing push-button switch is not required, the structure is simplified and gets thinner. Because indication of the display is transmitted until the transmissible key switch body through the transparent electrode substrate and the transparent electrode without passing a thick air layer, visibility is improved.

(14) Because the inside of the key switch body is sealed up, dust-and-waterproofing for the transparent electrode and the transparent electrode substrate is securely carried out.

(15) Because the front side of the display and the inner surface side of the key switch body is sealed up with the display case and also because the display is sealed up between the control substrates and the display case, inroad of dust, water, or the like is prevented, thereby deterioration of visibility is dissolved.

(16) Because the display surface and the inner surface of the key switch body is securely sealed up in the accommodating portion of the display case, the effect in the invention as set forth in the above claim 15 is promoted.

(17) Because moisture in the casing is absorbed by a desiccant, a fog of the inner surface of the key switch body is prevented securely and clear indication is secured.

(18) Because the curved resilient portion absorbs a stroke of the cantilevered key switch body, smooth switch-operation is attained and also durability of the elastic sealing member is improved, thereby dust-and-waterproofing can be guaranteed in a long term.

The above and other objects and features of the present invention will become more apparent from the following description taken in conjunction with the accompanying drawings.

BRIEF DESCRIPTION OF THE DRAWINGS

FIG. 14 is a longitudinal sectional view showing the sealing rubber switch assembly;

DESCRIPTION OF THE PREFERRED EMBODIMENT

Embodiments of the present invention will now be described in further detail with reference to the accompanying drawings.

FIGS. 1–4 show a first embodiment of a push switch structure (i.e. switch module) in accordance with the present invention.

Figure 1:
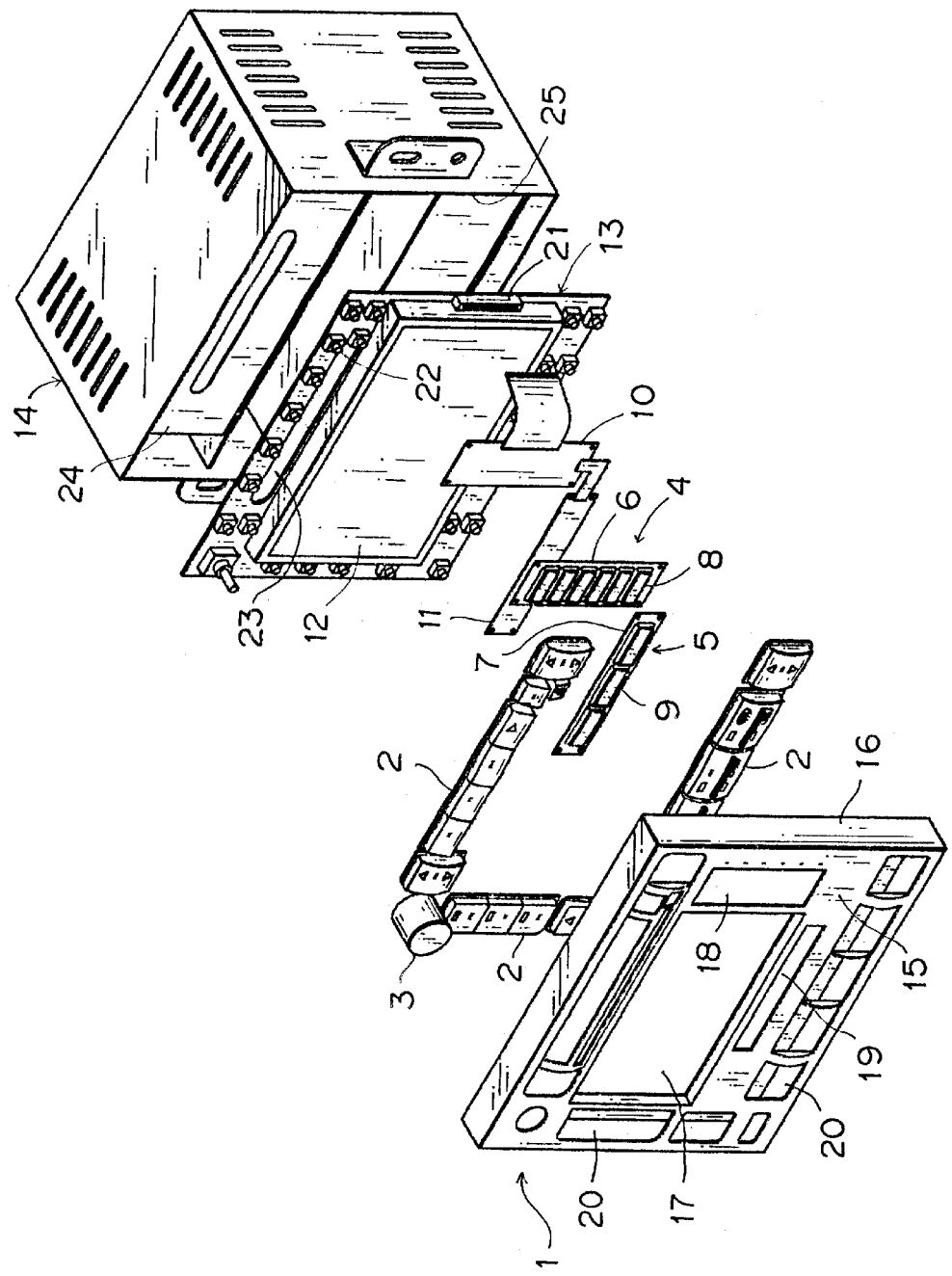
FIG. 1 is a perspective view showing a first embodiment of the push switch structure in accordance with the present invention.

In FIG. 1, 1 is a front cover made of synthetic resin; 2 is a printed key switch body made of synthetic resin to be placed in the front cover 1; 3 is a rotary adjusting knob; 4 and 5 are sealing rubber switch assemblies (i.e. assembled units) (refer to FIG. 2) to be a distinctive portion of the present invention, wherein light-transmissible (hereinafter, transmissible) key switch bodies 8, 9 are surrounded with respective sealing rubbers (i.e. elastic sealing members) 6, 7; 10, 11 are transparent electrode substrates which are closely attached to the backside of the respective assembled units 4, 5; 12 is a display to which the transparent electrode substrates 10, 11 cohere; 13 is a control substrate to which the display 12 is attached; and 14 is a metal casing to which the above components are assembled. Here, the front cover 1, the printed key switch body 2, the display 12, the control substrate 13, and casing 14 each have a similar structure to conventional ones.

The front cover 1 consists of a front wall 15 and a frame wall 16, and a display window 17 for the display 12, receiving openings 18, 19 for the sealing rubber switch assemblies 4, 5 located at a side and a bottom, respectively, of the display window 17, and receiving openings 20 for the printed key switch bodies 2 are provided on the front wall 15.

And, the control substrate 13 is provided with a connector portion 21 for connection with the transparent electrode substrates 10, 11, push-button switches (i.e., microswitch) 22 for the printed key switch bodies 2, and an inserting slit 23 for CD (i.e., compact disk memory). Such an equipment 24 as a compact disk player and the like is accommodated in the casing 14. An opening 24 for receiving the control substrate 13 and the front cover 1 is provided on the front side of casing 14.

Figure 2:
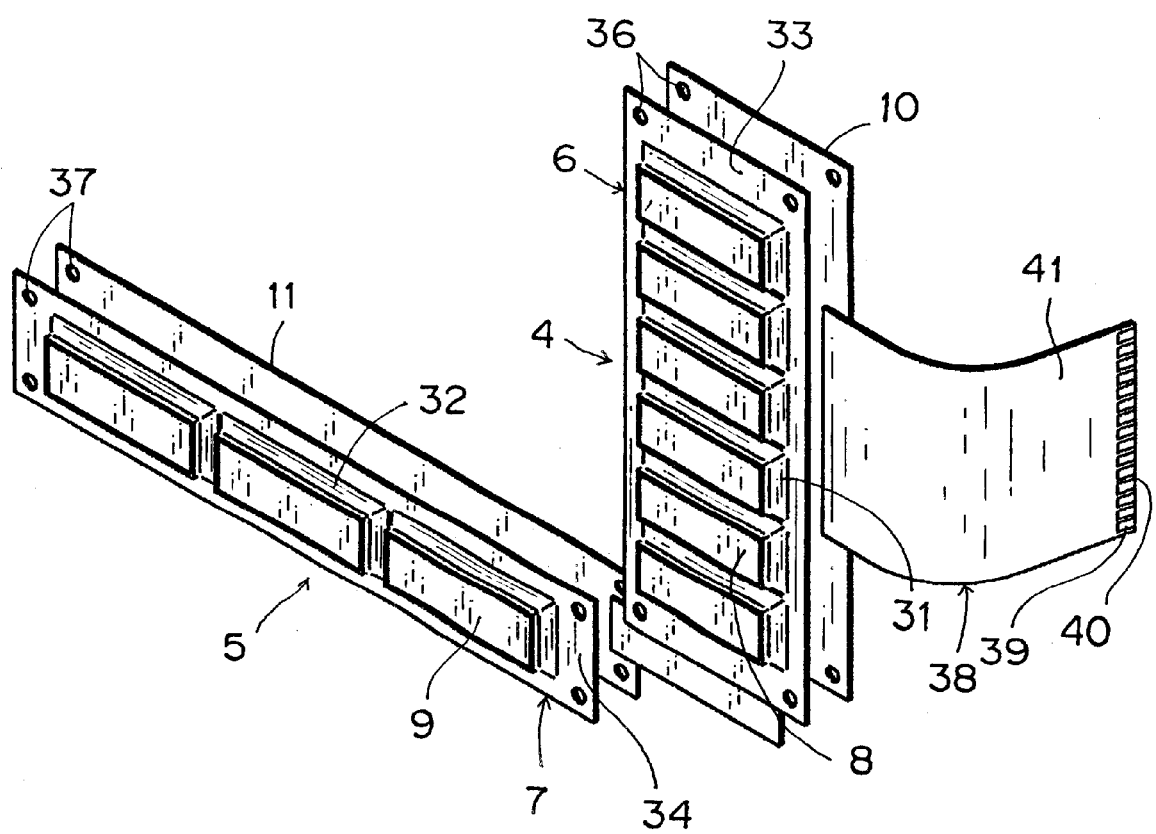
FIG. 2 is a perspective view showing a main portion of the push switch structure.
Figure 3:
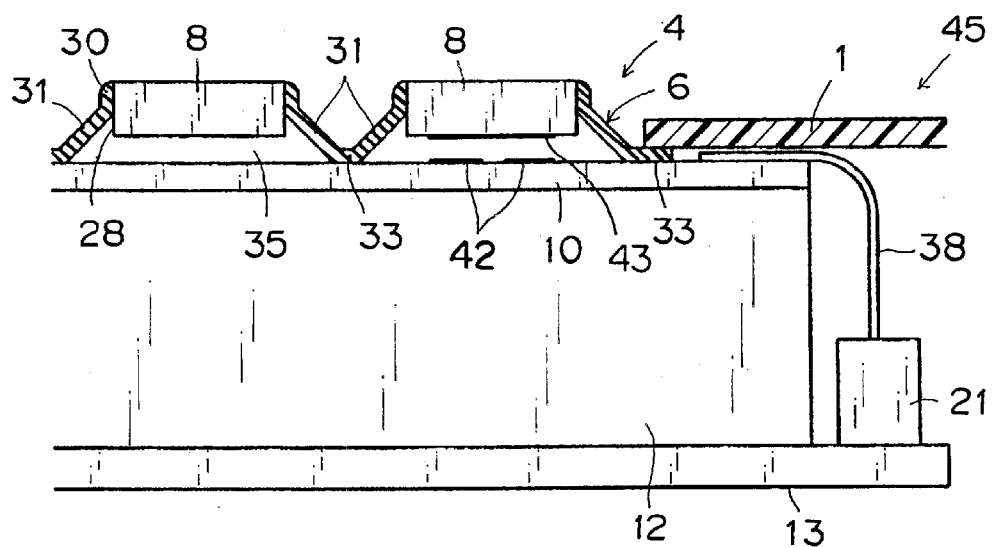
FIG. 3 is a longitudinal sectional view showing the assembled state of the push switch structure.

Referring to FIGS. 2 and 3, the sealing rubber switch assemblies 4, 5 consist of a plurality of transmissible key switch bodies 8, 9 made of synthetic resin and elastic sealing rubbers 6, 7 integrally surrounding the key switch bodies 8, 9. The key switch bodies 8, 9 of the present embodiment each are formed in a rectangular shape with some thickness. The sealing rubbers 6, 7, adhere to a four-sided peripheral wall 28 (FIG. 3) of the key switch bodies 8, 9 and have thin inclined portions 31, 32 spreading outward from an adhering portion 30 (FIG. 3) toward the transparent electrode substrates 10, 11 and base portions 33, 34 to cohere to the respective transparent electrode substrate 10, 11. For example, the sealing rubbers 6, 7 are integrally formed with the key switch bodies 8, 9 with use of a silicone rubber sheet. Also, the key switch bodies 8, 9 can be joined to the sealing rubbers 6, 7 by means of an adhesive, welding, or chemical welding.

The key switch bodies 8, 9 are elastically movably lifted from the respective base portions 33, 34 by an inclined portion 31 of each of the sealing rubbers 6, 7. A space 35 (FIG. 3) for a pushing stroke is provided between the transparent electrode substrates 10, 11 and the key switch bodies 8, 9. The inclined portion 31 is not limited to a straight one. The base portion 33 and the inclined portion 31 are provided between the neighboring key switch bodies 8 (FIG. 3).

In the present embodiment, referring to FIG. 2, the sealing rubber switch assembly (assembled unit) 4 with six parallel key switch bodies 8 arranged vertically and the sealing rubber switch assembly (assembled unit) 5 with three serial key switch bodies 9 arranged laterally are provided.

Screw holes 36, 37 for fixation are provided on the four corners of the base portions 33, 34 of the sealing rubber 6, 7 and on the four corners of the transparent electrode substrates 10, 11. Referring to FIG. 3, the base portions 33, 34 of the sealing rubbers 6, 7 (FIG. 2) and the respective transparent electrode substrates 10, 11 (FIG. 2) are pressed by the back of the front cover 1. The surface of the base portions 33, 34 and the back of the front cover 1 cohere elastically each other and the back of the base portion 33 and the surface of the transparent electrode substrate 10 cohere elastically, whereby secure waterproofing is attained. In the present embodiment, since the sealing rubber 6 adheres to the flat transparent electrode substrate 10, dust and water proofing property of the sealing rubber switch assembly 4 as well as its assembling process is improved.

The base portion 33 between the key switch bodies 8, 8 is put into close contact with the transparent electrode substrate 10 without being pushed with the front cover 1. The base portion 33, the transparent electrode substrate 10, and a window frame portion (not illustrated) of the display 12 may adhere with adhesive. In case that the base portion 33 between the key switch bodies 8, 8 adheres to the transparent electrode substrate 10, each of the spaces 35 of the respective key switch bodies 8 is sectioned and sealed, whereby moisture-proof property and defogging property of the back of the key switch body 8 and the surface of the transparent electrode substrate 10 is further improved. Because the key switch body 8 and the sealing rubber 6 adhere to each other without a clearance by integral molding or adhesion, water does not invade into the inside.

A flexible flat cable 38 (only the cable at the transparent electrode substrate 10 side is illustrated) is connected to each of the transparent electrode substrates 10, 11. A conductor 39 is exposed at a front end portion of the flat cable 38, and then a connecting portion 40 of card edge type is formed. The conductor 39 exposes by tearing off a part of an insulating cover 41 of the flat cable 38.

Referring to FIG. 3, the connecting portion 40 (FIG. 2) of the flat cable 38 is connected to a connector 21 of the control substrate 13. The flat cable 38 is positioned outside the base portion 33 of the sealing rubber 6. As described above, the base portion 33 of the sealing rubber 6 coheres to the surface of the transparent electrode substrate 10, the space 35 is provided between the key switch body 8 and the transparent electrode substrate 10, the transparent electrode substrate 10 coheres to the surface of display 12, and the display 12 is assembled to the control substrate 13.

Figure 4:
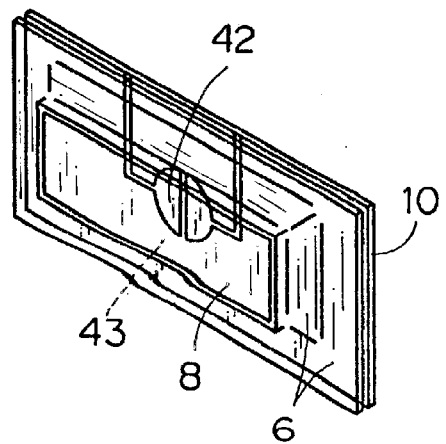
FIG. 4 is a perspective view showing a first example of a sealing rubber switch assembly.

The transparent electrode substrates 10, 11 (FIG. 2) each have a transparent thin-film electrode on a transparent substrate body. Referring to FIGS. 3 and 4, a similar transparent electrode substrate 43 facing the transparent electrode 42 of the transparent electrode substrate 10 is formed on the back of the key switch body 8. The transparent electrode 43 on a side of the key switch body comes into contact with the transparent electrode 42 of the transparent electrode substrate 10 (FIG. 3) by pushing the key switch body 8, whereby the switch gets on. Only a middle portion of the key switch body 8 may be formed out of a transparent resin member and the other portion may be formed out of an opaque resin member. The sealing rubber switch assembly 5 has a structure similar to the above-described one.

A push-button switch conventionally used is not required because of the transparent electrode 43 on the key switch bodies 8, 9. And, because the key switch bodies 8, 9 resile due to elasticity of the sealing rubbers 6, 7, parts such as a spring is not required. Durability of the sealing rubbers 6, 7 are sufficiently high. These promote simplification and thin-modeling of the structure. And, the key switch bodies 8, 9 made of synthetic resin, which key switch bodies 8, 9 are harder than the sealing rubbers 6, 7, give a secure operating touch and secure visibility of the display 12. Also, because transparent electrode substrates 10, 11 cohere to the display 12, indication of the display 12 can transmit the transparent electrode substrates 10, 11 and can be looked at over the key switch bodies 8, 9 with high visibility. For example, when the key switch bodies 8, 9 are looked at obliquely, because a refractive index of the transparent electrode substrates 10, 11 is bigger than that of the air, a dead angle on the display decreases, whereby clear indication can be obtained without missing a corner portion of a character to be indicated. Due to the thin transparent electrode substrates 10, 11, thin-modeling of push switch structure (i.e., switch module 45 in FIG. 3) is attained.

Further, because the circumference including the interval of the key switch bodies 8 (FIG. 3) is surrounded with the sealing rubber 6, the waterproofing and the dustproofing for the key switch body 8 are securely attained. Still further, because a plurality of key switch bodies 8 are integrated by means of the sealing rubber 6 in good order and are formed into a module as the sealing rubber switch assembly 4, positioning of a plurality of key switch bodies 8 onto a determined place of the display 12 and their assembly work can be effectively executed. Of course, only one key switch body 8 can be arranged.

Figure 5:
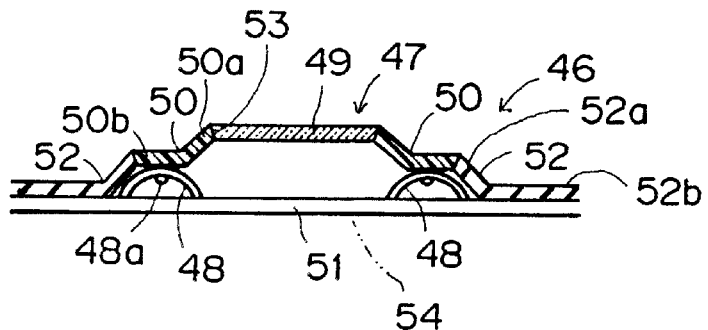
FIG. 5 is a longitudinal sectional view showing a second example of the sealing rubber switch assembly.
Figure 6:
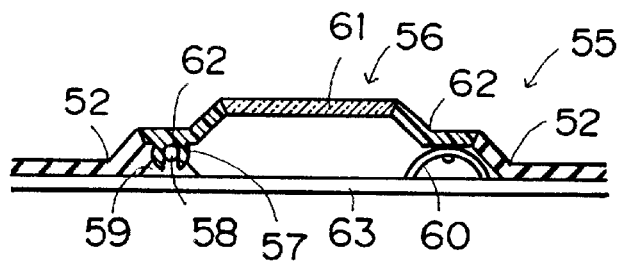
FIG. 6 is a longitudinal sectional view showing a third example of the sealing rubber switch assembly.
Figure 7:
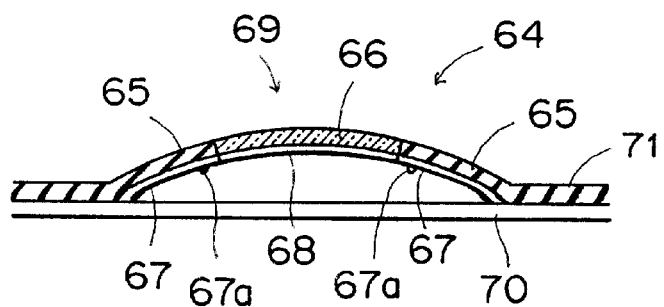
FIG. 7 is a longitudinal sectional view showing a fourth example of the sealing rubber switch assembly.

FIGS. 5–7 show other examples of the sealing rubber switch assembly.

In these structures, a contact made of a metal spring is provided inside the key switch body in order to enhance a clicking-feel at switch-operation, because vehicle-applied equipment requires bigger switch-operating force than that for home electric appliances or the like.

In the sealing rubber switch assembly 46 of FIG. 5, circular arc metal contacts 48, 48 are arranged on both sides of the key switch body 47. The key switch body 47 includes a transmissible (or transparent) resin member (i.e. transmissible portion) 49 in the middle portion including a key-top and a non-transmissible (or opaque) black resin member (i.e. non-transmissible portion) 50 surrounding the transmissible resin member 49. The non-transmissible resin member 50 bends and also includes a sloping portion 50*a* continuing from the transmissible resin member 49 and a parallel portion 50*b* continuing from the sloping portion 50*a*. The parallel portion 50*b* is positioned lower by one step than the resin member 49 toward a transparent electrode substrate 51 side. The metal contact 48 is arranged inside the parallel portion 50*b*. A sealing rubber 52 to be an elastic sealing member is provided integrally around the parallel portion 50*b*.

The transmissible resin member 49 and the non-transmissible resin member 50 are integrally formed out of ABS resin, for example. The sealing rubber 52 has a sloping portion 52*a* and a base portion 52*b*, and the base portion 52*b* coheres to the electrode substrate 51. The base portion 52*b* is put between the electrode substrate 51 and the front cover (cf. Reference numeral 1 of FIG. 3) in a dust-and-waterproofing state. A contact point 48*a* is positioned in the center of the circular arc metal contact 48. By pushing the key switch body 47, the metal contact 48 bends inward and the contact point 48*a* comes into contact with a contact point on the electrode substrate 51, thereby making a switch-on state. Resilience is shown by means of the sloping portion 52*a* of the sealing rubber 52 and the circular arc metal contact 48, and a clicking-feel at the pushing-operation of the key switch body 47 is enhanced with this resilience.

A joining plane 53 of the transmissible resin member 49 and the non-transmissible resin member 50 is not vertical but is inclined. This widens a visual angle for a driver and enhances mechanical strength of the key switch body 47 in the pushing direction.

When a driver looks at the key switch body 47 obliquely, there exists a dead angle inside the key switch body 47. Therefore, the transmissible resin member 49 is obliquely cut correspondingly to a viewing angle from a driver. Simultaneously, the metal contact 48 is arranged within the hidden portion, i.e. the remaining portion of the dead angle, of the key switch body, whereby the metal contact 48 is hidden and space in the key switch body is utilized effectively.

The electrode substrate 51 may not be the transparent one. In such a case, an opening or a partial transparent portion facing the transmissible resin member 49 is provided on the electrode substrate 51 so that indication of the display 54 can reach the resin member 49. The same is applicable to the examples of FIGS. 6 and 7.

In the sealing rubber switch assembly 55 of FIG. 6, a hinge holding portion 57 is provided on one side of a key switch body 56, and a circular arc metal contact 60 similar to that of FIG. 5 is provided on the other side of the key switch body 56. The hinge holding portion 57 and the metal contact 60 are provided on the backside of a non-transmissible resin member 62 continuing from a transmissible resin member 61, whereby a dead space is effectively utilized. A holding projection 59 is provided on an electrode substrate 63, and a hinge axis 58 projects in parallel with the electrode substrate 63 from the holding projection 59. 52 is a sealing rubber. Because the hinge (57, 58) is provided on one side of the key switch body 56 and the circular arc metal contact 60 is provided the other side, a driver can get only one secure clicking-feel.

In the sealing rubber switch assembly 64 of FIG. 7, a transmissible resin member 66 is integrally formed in the middle of a domed sealing rubber 65. A domed metal contact 67 is arranged along the inside of the sealing rubber 65, and an opening 68 corresponding to the transmissible resin member 66 is provided in a middle portion of the metal contact 67. A pair of contact points 67*a* are provided on respective sides of the opening 68 of the metal contact 67. A key switch body 69 is made up of the transmissible resin member 66 and the sealing rubber 65.

The contact point 67*a* comes into contact with a contact point on the electrode substrate 70 by pushing the resin member 66, thereby making the electric connection. The domed sealing rubber 65 continues to a flat sealing rubber base portion 71, and the sealing rubber base portion 71 coheres to the electrode substrate 70. A non-transmissible resin member (i.e. reference character 62 of FIG. 6) is not used in this example. A hinge similar to that of FIG. 6 may be provided under one side of the sealing rubber 65, and the metal contact 67 may be provided under the other side of the sealing rubber 65.

According to the structures shown in the above FIGS. 5–7, a secure clicking-feel at switch-operation can be attained in addition to the effects of the structures of FIGS. 1–4. Because general electrode substrates 51, 63, 70 for use with the metal contacts 48, 60, 67 can be applied in place of transparent electrode substrates, cost reduction can be attained. Dust-and-waterproofing of the metal contacts 48, 60, 67 can be done by the sealing rubbers 52, 65. Here, only one or plurality of each of the above key switch bodies 47, 56, 69 may be arranged.

Next, FIGS. 8–15 show a second embodiment of a push switch structure (i.e. switch module) in accordance with the present invention.

Figure 8:
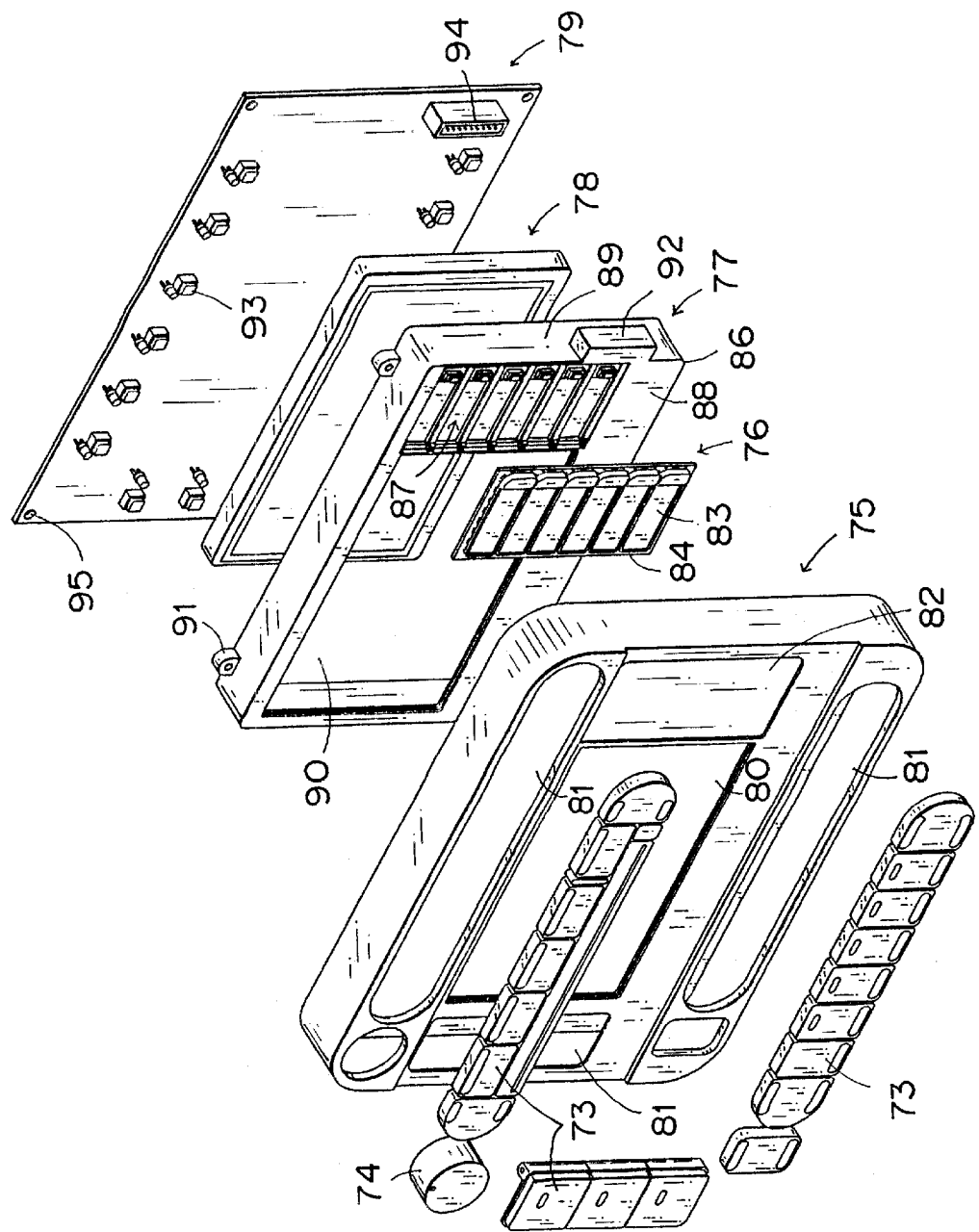
FIG. 8 is a perspective view showing a second embodiment of the push switch structure in accordance with the present invention.

In FIG. 8, 73 is a printed key switch body; 74 is a rotary adjusting knob; 75 is a front cover made of synthetic resin; 76 is a sealing rubber switch assembly to be a first distinctive portion of the present embodiment; 77 is a display case to be a second distinctive portion of the present embodiment; 78 is a display; and 79 is a control substrate. An illustration of a metal casing (cf. reference character 14 of FIG. 1) is omitted.

The front cover 75 is provided with a display window 80 for the display 78 in the middle portion, an opening 81 for a plurality of printed key switch bodies 74 at the top and bottom portions of the display window 80 and also on one side thereof, and another opening 82 for the sealing rubber switch assembly 76 on the other side of the display window 80. The printed key switch body 73 may be inserted in the opening 81 from the surface of the front cover 75 or from the backside of the front cover 75 in an assembled state with the control substrate 79.

The sealing rubber switch assembly 76 of the present embodiment is almost similar to the previous embodiment. In order to make the key switch body 83 cantilevered and to secure a switch stroke, a sealing rubber (elastic sealing member) 84 has a slack. (details are described later). The sealing rubber switch assembly 76 is assembled in the display case 77 beforehand. The transmissible key switch body 83 of the sealing rubber switch assembly 76 is arranged in parallel to the display 78.

A case body 86 of the display case 77 of synthetic resin has an accommodating portion 87 for accommodating the sealing rubber switch assembly 76. The case body 86 consists of a front wall 88 and a peripheral wall 89. A display window 90 and the accommodating portion 87 are provided on the front wall 88. A pair of fixing portions 91 are provided on each of top and bottom peripheral walls 89. And, a connector portion 92 for the control substrate 79 is provided also on the peripheral wall 89 at a near portion to the accommodating portion 87.

The display 78 may be of LCD or of ELD. The display 78 faces a display window 90 of the display case 77. The control substrate 79 is larger than the display 78 and formed in almost the same size as the display case 77. And, The control substrate 79 has push-button switches 93 for the printed key switch bodies 73 at the top, bottom, and one side portions and also has a connector portion 94 for the connector portion 92 of the display case 77 on the other side. A fixing hole 95 for the fixing portion 91 of the display case 77 is provided on each of the four corners of the control substrate 79.

Figure 9:
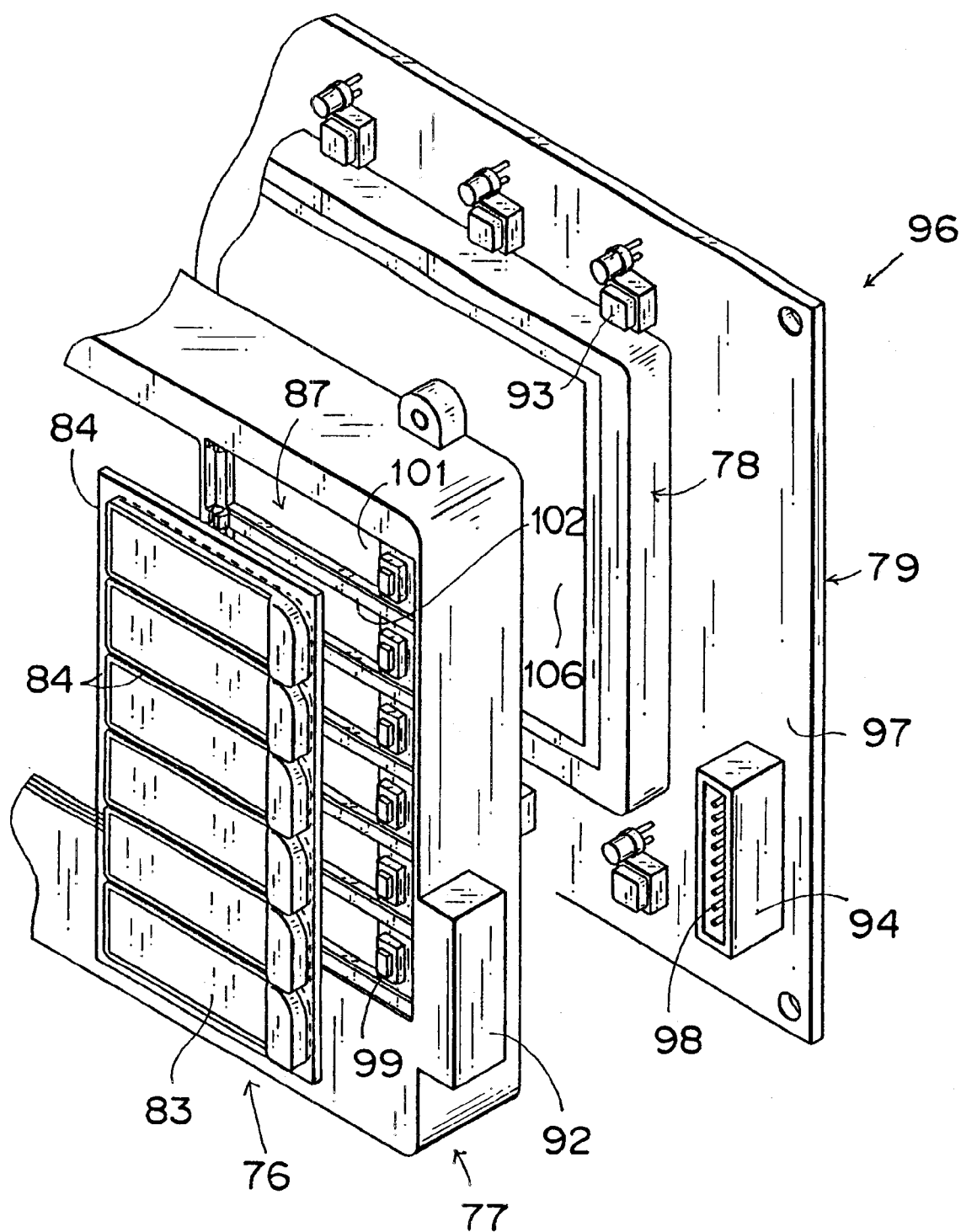
FIG. 9 is a perspective view showing a main portion of the push switch structure.

Referring to FIG. 9, the display 78 is assembled on the control substrate 79, which constitutes a control substrate assembly 96. The sealing rubber switch assembly 76 is assembled in the accommodating portion 87 of the display case 77. The sealing rubber 84 coheres to the display case 77. The sealing rubber switch assembly 76 may engage the accommodating portion 87 with an engaging means (not illustrated). A peripheral edge portion of the sealing rubber 84 may be glued to the display case 77.

After assemblage of the sealing rubber switch assembly 76 to the display case 77, the display case 77 is assembled to the control substrate assembly 96. The assembly work may be done in a dustproof chamber. Inside the display case 77, for example, inside the accommodating portion 87, a dehumidifying agent (not illustrated) to prevent the inside of the transmissible key switch body 83 from getting fogged is set.

The connector portion 94 on the control substrate 79 is provided on the surface of a substrate body 97 and has a terminal portion 98, continuing to a printed circuit or the like on the control substrate 79, in its housing made of synthetic resin. The connector portion 92 on the display case 77 has a terminal portion, continuing to push-button switches 99 on a side of the accommodating portion 87, in its housing.

The key switch bodies 83 of the sealing rubber switch assembly 76 are formed in a rectangular shape and are arranged in parallel vertically. The circumference including the interval between the key switch bodies 83 is surrounded with the thin sealing rubber 84 integrally. One side of each of the key switch bodies 83 is capable of moving about a hinge (not illustrated) as a fulcrum in a switch-pushing direction, which hinge is arranged on the other side of the key switch body 83. The push-button switch 99 is pushed by the key switch body 83. Openings 101 are provided on the accommodating portion 87 correspondingly to the key switch bodies 83.

Figure 10:
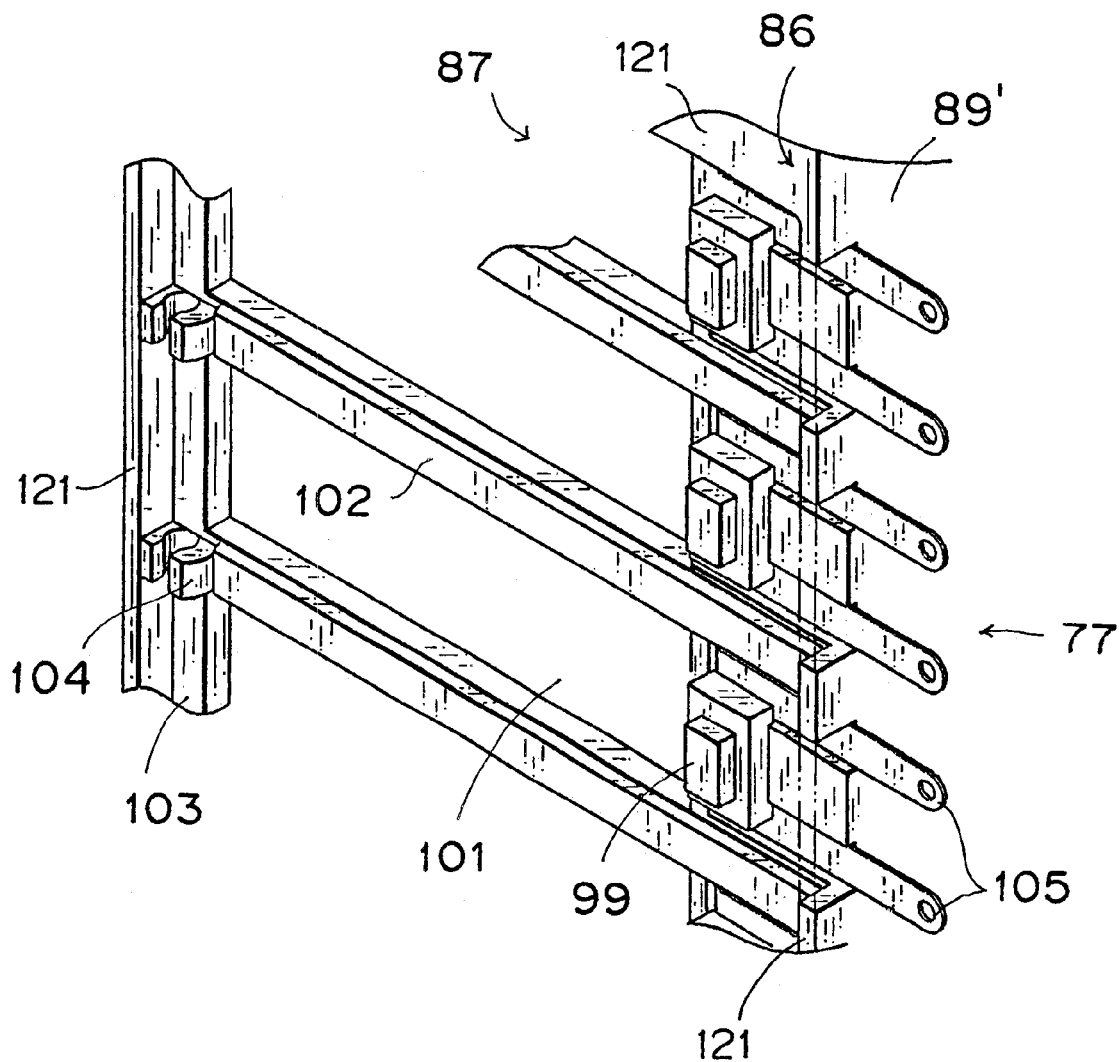
FIG. 10 is a perspective view showing a structure of an accommodating portion of a display case.

An example of the accommodating portion 87 of the display case 77 is shown in FIG. 10. Lateral partitions 102 are formed integrally with the case body 86 made of synthetic resin, and the openings 101 for making the indication of the display 78 (FIG. 9) pass through are formed between each of the partitions 102. One end of each of the partitions 102 is connected to a vertical supporting wall 103. Hinge holding portions 104 project from the supporting wall 103 at the one end side of the partition 102. The other end of each of the partitions 102 is connected to a peripheral wall 89' of the case body 86. The push-button switches 99 are arranged adjacent to the openings 101, and a pair of lead terminals 105 of each of the push-button switches 99 project from the peripheral wall 89'.

Figure 11:
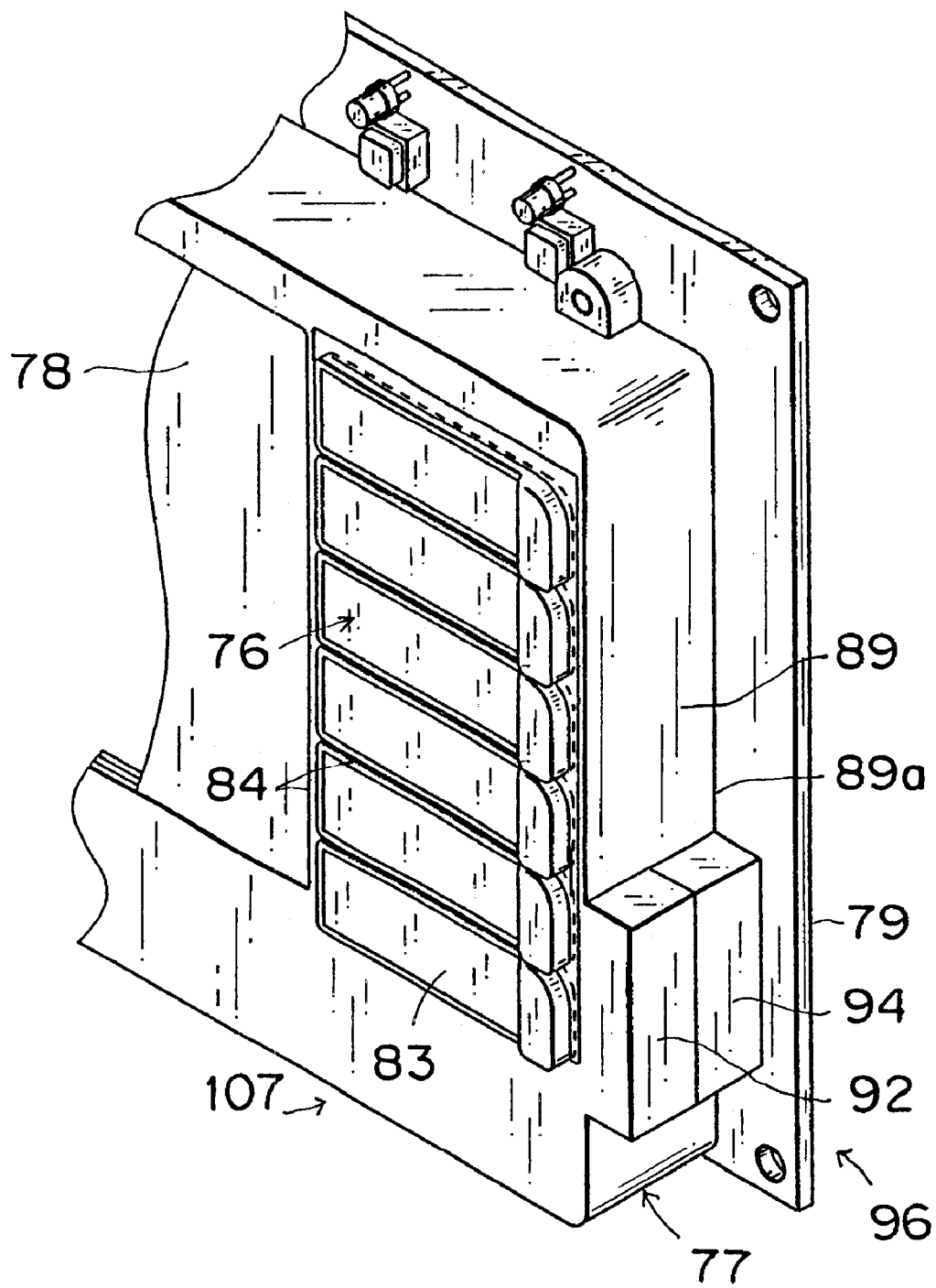
FIG. 11 is a perspective view showing the assembled state of the push switch structure.

As shown in FIGS. 9 and 11, the lead terminal (not illustrated) may be accommodated inside the peripheral wall 89. The lead terminals connect with terminals in the connector portions 92.

The accommodating portion 87 is sectioned with the partitions 102 and the supporting wall 103. The back of the partitions 102 and the back of the supporting wall 103 are put into contact with a display surface 106 of the display 78 (FIG. 9). The sealing rubber 84 coheres to a periphery 121 of the accommodating portion 87 and is pushed with the front cover 75. The sealing rubber may be glued to the periphery 121 and may cohere to the partitions 102 and the supporting wall 103.

A hinge axis of the key switch body 83 (FIG. 9) engages the hinge holding portion 104, whereby the key switch body 83 is supported in a cantilevered state. The hinge holding portion 104 consists of a pair of resilient engaging claws so as to easily engage the hinge axis. The clicking-feel at switch-operation is obtained due to the push switch 99.

Referring to FIG. 11, after having assembled the sealing rubber switch assembly 76 to the display case 77, the display case assembly 107 is assembled to the control substrate assembly 96. Because the partitions 102 and the supporting wall 103 of the accommodating portion 87 (FIG. 10) are put into contact with the display surface of the display 78 and further the opening 101 is covered with the sealing rubber switch assembly 76 (FIG. 11), inroad of water, dust, or the like into the accommodating portion 87 is prevented and the push-button switch 99 and so no are protected.

Clearances between the key switch bodies 83 and the display case 77 are sealed up with the sealing rubber 84, and the end 89a of the peripheral wall 89 of the display case 77 coheres to the control substrate 79, thereby attaining high dust-and-water proofing property. Simultaneously with assemblage of the display case assembly 107 to the control substrate assembly 96, both connectors 92, 94 are coupled.

Figure 12:
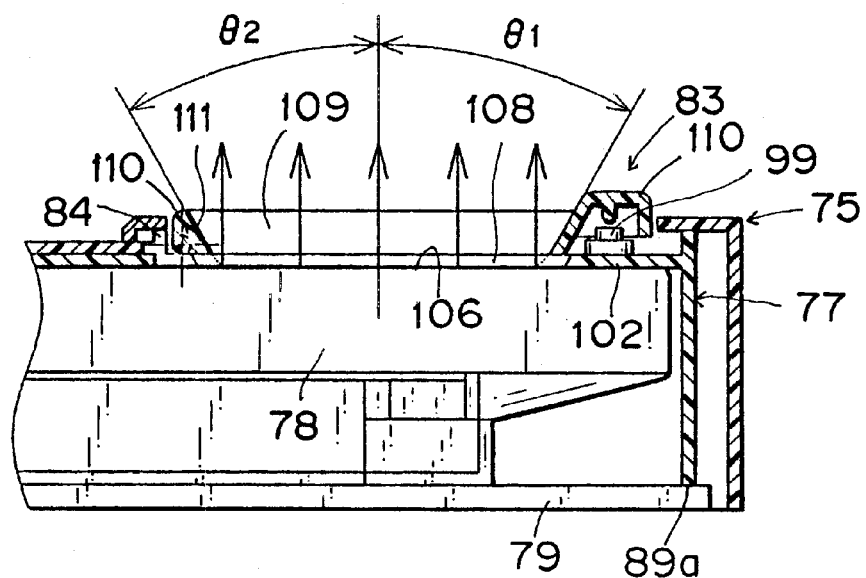
FIG. 12 is a longitudinal sectional view showing the assembled state of the push switch structure.

Referring to FIG. 12, indication of the display 78 transmits the transparent resin member 109 of the key switch body 83 through thin layer space 108 caused by the partition 102. The sealing rubber 84 is pushed and fixed by the front cover 75.

Figure 13:
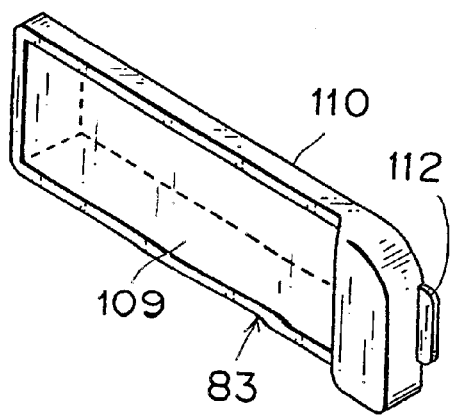
FIG. 13 is a perspective view showing a key switch body.

As also show in FIG. 13, the key switch body 83 consists of the transmissible resin member 109 in the middle portion thereof and the non-transmissible resin member 110 on the peripheral portion thereof. That is, the key switch body 83 is two-color-molded out of synthetic resin. Joining plane 111 of both resin members 109, 110 has angles of θ1, θ2 as shown in FIG. 12. Leak of light from the peripheral portion of the key switch body 83 is prevented with the non-transmissible resin member 110.

A stopping projection 112 (FIG. 13) is provided on one end portion, i.e. the maximum-stroke portion, of the non-transmissible resin member 110 and abuts against the inner surface of the front wall of the front cover 75 (FIG. 12).

Referring to FIG. 14, a plurality of key switch bodies 83 are closely arranged, and the non-transmissible resin member 110 of the-key switch body 83 is connected with a U-shaped resilient portion 114 of the sealing rubber 84 (FIG. 11). The non-transmissible resin member 110 has a sloping portion 110a joined to the transmissible resin member 109 and a projecting portion 110b outwardly projecting from an end side of the sloping portion 110a. An end face of the curved the resilient portion 114 of the sealing rubber 84 is joined to the back of the projecting portion 110b. The resilient portion 114 is positioned on the partition 102 on the display 78. 115 is a space for shifting the key switch body 83.

Figure 15A:
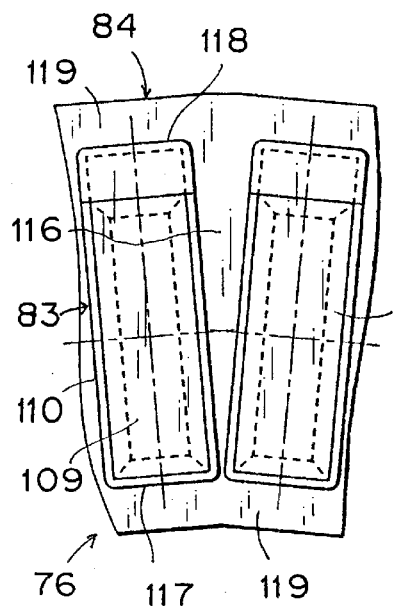
FIG. 15A is a plan view showing the sealing rubber switch assembly in a flat state.

As shown in FIG. 15A, the sealing rubber switch assembly 76 initially has a sector portion 116 of the sealing rubber 84 between the key switch bodies 83 neighboring each other. The sector portion 116 is widened from a side of a hinged end 117 of the key switch body 83 to a side of an operation end 118. The sector portion 116 continues to a base portion 119 of the sealing rubber 84.

Figure 15B:
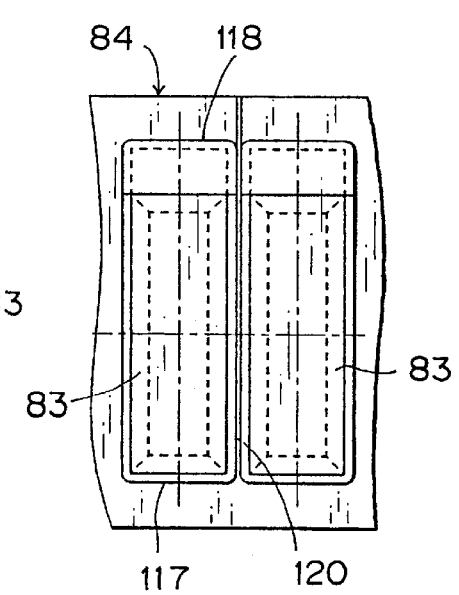
FIG. 15B is a plan view showing the sealing rubber switch assembly in a transformed state.

When the sealing rubber switch assembly 76 is assembled to the display case 77 (FIG. 9) or in a forming process of the sealing rubber switch assembly 76, the key switch bodies 83 are closed to each other as shown in FIG. 15B, wherein the sector portion 116 (FIG. 15A) is pressed and bends in a U-shape and the resilient portion 114 (FIG. 14) is formed. The key switch bodies 83 are arranged in parallel.

Stroke of the cantilevered key switch body 83 is secured due to the resilient portion 114. The resilient portion 114 becomes thicker from the hinged end 117 side to the operation end 118 side, whereby the key switch body 83 can be smoothly and securely operated.

The transparent electrode substrates 10, 42 of the first embodiment (FIGS. 1–4) may be applied to the present second embodiment (FIGS. 8–15). That is, the assembly of the sealing rubber switch assembly 76 and the transparent electrode substrates 10, 42 may be mounted to the accommodating portion 87 of the display case 77. In that case, the transparent electrode substrate 10 is connected to the connector 92. And, the above-described dust-and-waterproof structures may be applied to the printed key switch bodies 2, 73.

Further, an elastic sealing member such as cellular sponge and urethane (not illustrated) may be used in place of the sealing rubber 6, 84. In this case, the elastic sealing members of sponge or urethane is arranged around the key switch body, or a groove to receive the lower half of the key switch body is formed in the surface side of the tabular cellular sponge and the key switch body is fitted in the groove without a gap. And, the sponge is laid in the accommodating portion of the display case. With this structure, the key switch body returns with elasticity of the sponge, and a dust-and-water proofing property is obtained with the sponge cohering to the key switch body and the accommodating portion.

Finally, FIGS. 16–19 show a third embodiment of a push switch structure in accordance with the present invention.

In this the embodiment, a key switch body 156 is inserted in an opening portion 159 of a sealing rubber 157 (FIG. 16) and coheres thereto, and the key switch body 156 and the sealing rubber 157 cohere to each other with resilience of the sealing rubber 157.

Figure 16:
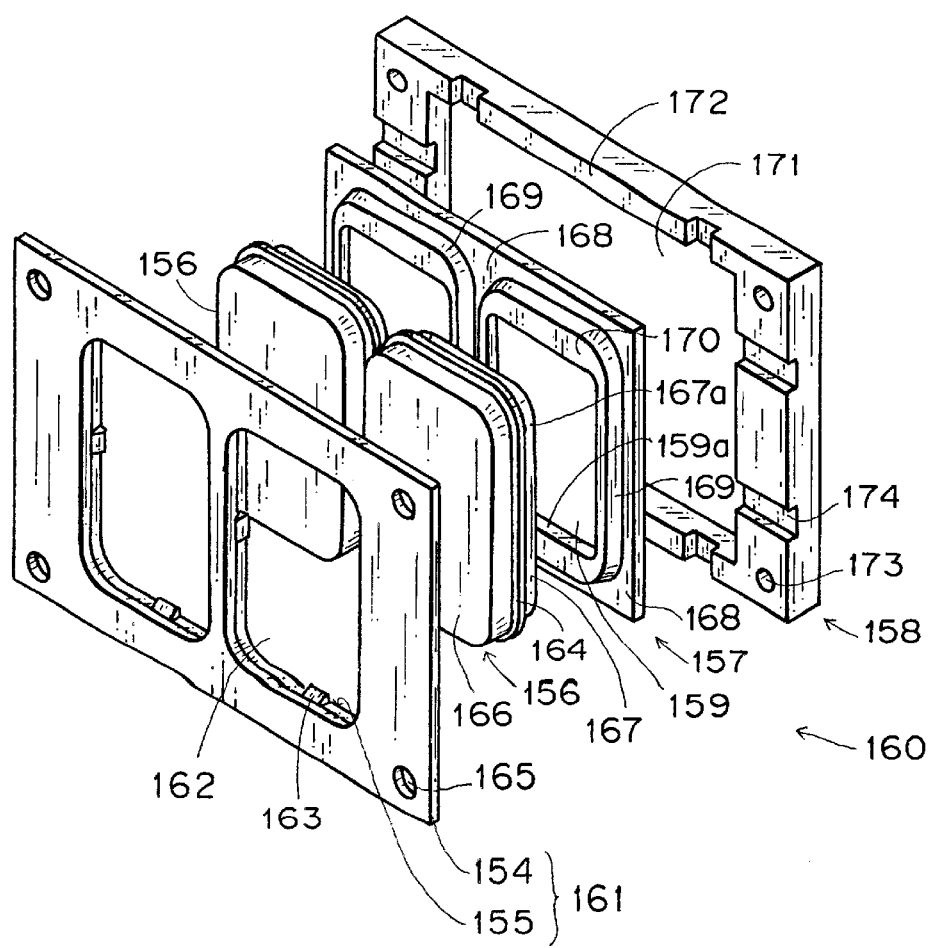
FIG. 16 is a perspective view showing a third embodiment of the push switch structure in accordance with the present invention.

FIG. 16 shows an example of the present embodiment. This push switch structure (i.e. switch module 160) includes a cover 161 of synthetic resin, the key switch body 156 of synthetic resin, the sealing rubber 157 to be an elastic sealing member, and a base member 158 of synthetic resin. The cover 161 consists of a tabular front cover 154 and a sub-cover 155 coherent to the backside of the front cover 154 and has a four-sided opening portion 162 for the key switch body 156. On each side of the opening portion 162 of the sub-cover 155, a projection 163 to support the key switch body 156 is formed. The projection 163 enables the key switch body 156 to be correctly positioned and smoothly operated and also enables a collar portion 164 to securely abut against. A screw hole 165 for fixing the base member 158 is provided at each of the four corners of the front cover 154. The cover 161 is made of ABS resin or polycarbonate.

The key switch body 156 consists of a substantially rectangular operating portion (a displaying portion) 166, a rectangular engaging portion 167 being smaller than the operating portion 166 and continuing therefrom, and the collar portion 164 projecting over the whole circumference between the operating portion 166 and the engaging portion 167. The collar portion 164 and the engaging portion 167 are preferably made of non-transmissible material.

The operating portion 166 of the key switch body 156 can enter the opening portion 162 from the back side of the cover 161. The engaging portion 167 can enter the opening portion 159 of the sealing rubber 157 from the surface side of the sealing rubber 157. A peripheral surface 167a of the engaging portion 167 coheres to an inner surface 159a of the opening portion 159 of the sealing rubber 157. The front of the collar portion 164 faces the back of the sub-cover 155 and the back of the collar portion 164 faces the front of the sealing rubber 157, whereby the collar portion 164 coheres to the sub-cover 155 and to the sealing rubber 157. The key switch body 156 is made of methacrylic resin, acrylic resin, or polycarbonate, for example.

The sealing rubber 157 consists of a flat base portion 168, a sloping portion 169 raised from the opening portion on a side of the base portion 168 obliquely inwardly, an inwardly-facing collar portion 170 projecting from the end of the sloping portion 169 in parallel with the base portion 168, and a four-sided opening portion 15 formed inside the collar portion 170.

The inside dimension of the opening portion 159 is equal to or smaller than the outside dimension of the engaging portion 167. The front of the inwardly-facing collar portion 170 of the sealing rubber 157 closely abuts against the back of the outwardly-facing collar portion 164 of the key switch body 156. The base portion 168 is arranged around each of four-sided sloping portions 169 corresponding to each of the key switch bodies 156 neighboring each other. The peripheral portion of the base portion 168 faces the base member 158, and the back of the peripheral portion coheres to the front of the base member 158. The sealing rubber 157 is made of silicone rubber, for example.

The base member 158 is formed in a four-sided figure and has a big opening portion 171 a display (not illustrated). The peripheral portion of the base portion 168 of the sealing rubber 157 coheres to the front of the periphery 172 of the opening portion 171. The base member 158 is formed more a-size-larger than the base portion 168 of the sealing rubber 157. The opening portion 159 of the sealing rubber 157 faces the opening portion 171 of the base member 158. A threaded hole 173 for a screw hole 165 of the cover 161 is provided on each of the four corners of the base member 158. A transparent electrode substrate as in the first embodiment (reference character 11 of FIG. 2) may be arranged in the opening portion 171 of the base member 158. In this case, a groove 174 of the base member 158 acts as a lead-out portion for a lead wire of the transparent electrode substrate 11. The base member 158 is made of ABS resin or polycarbonate, for example.

Figure 17:
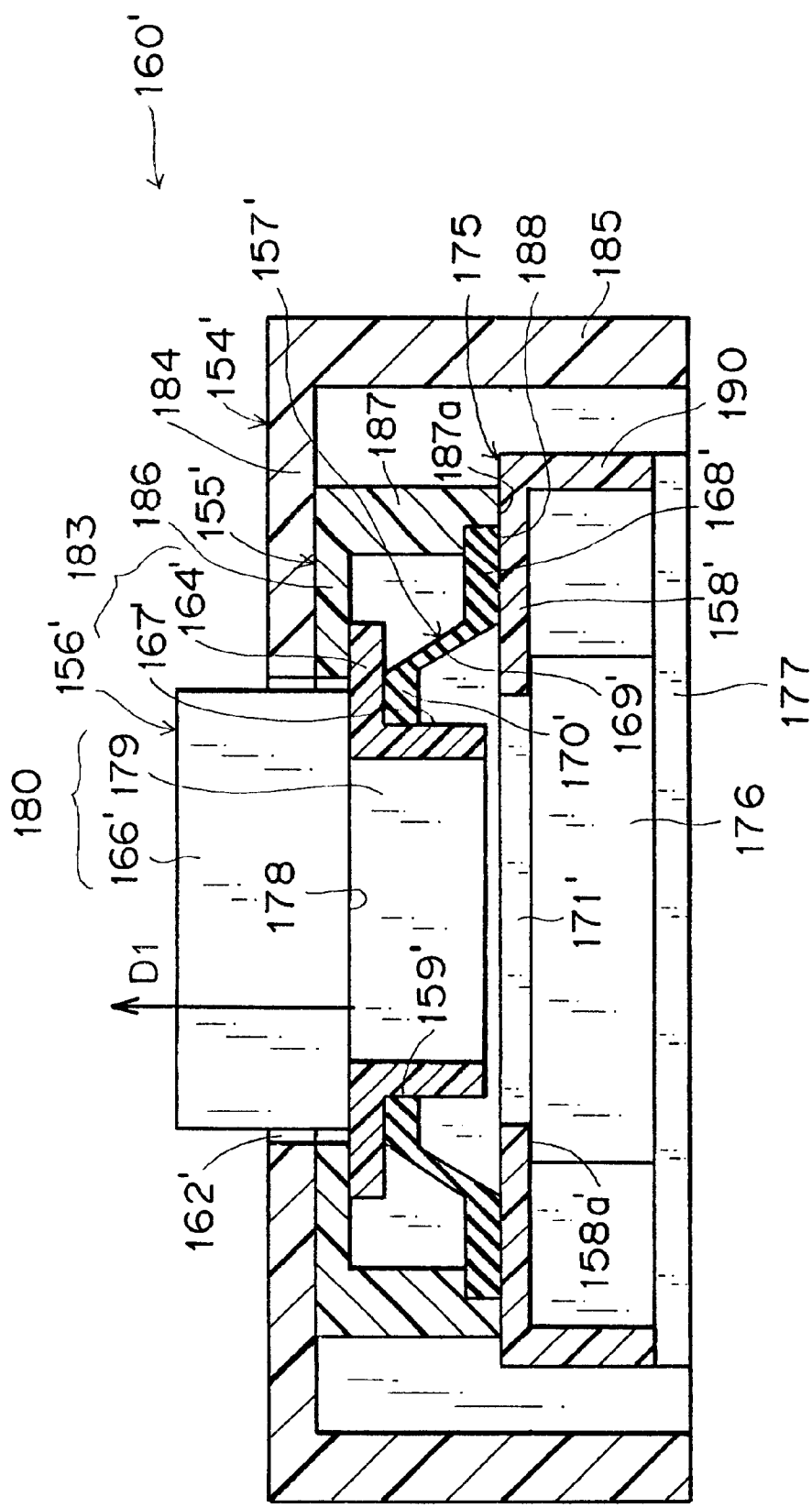
FIG. 17 is a sectional view showing the assembled state of an example similar to the structure of FIG. 16.

FIG. 17 shows a sectional view of an example similar to the structure of FIG. 16. In FIG. 17, a dash (') is attached to a reference character of an element same as or similar to the one in FIG. 16. Referring to FIG. 17, 154' is a front cover; 155' is a sub-cover; 156' is a key switch body; 157' is a sealing rubber as an elastic sealing member; 175 is a display case including a base wall (base member) 158'; 176 is a display; and 177 is a control substrate.

Material of each member is similar to that of the above-described embodiment. That is, the covers 154', 155' are made of ABS resin or polycarbonate; the key switch body 156' is formed by two-color molding out of methacrylic resin, acrylic resin, or polycarbonate; the sealing rubber 157' is made of silicone rubber; and the display case 175 is made of ABS resin or polycarbonate. And, the key switch body 156' is two-color-molded. That is, a transmissible portion 180 is set in permeability 40% with gray smoke and an outer non-transmissible portion 183 is formed in black. The sub-cover 155' and the display case 175 are formed in black.

The front cover 154' has a front wall 184 and a frame-like peripheral wall 185. The sub-cover 155', the sealing rubber 157', the display 176, the display cover 175, and the control substrate 177 are accommodated inside the front cover 154'. A front wall 186 of the sub-cover 155' coheres to the back of the front wall 184. The sub-cover 155' consists of the front wall 186 smaller than the front cover 154' and a frame-like peripheral wall 187. The end 187a of the peripheral wall 187 of the sub-cover 155' abuts against the base wall 158' of the display case 175. A groove 188 to sandwich the base portion 168' of the sealing rubber 157' is formed inside a front end portion of the peripheral wall 187 so that the peripheral portion of the base portion 168' is tightly put between the groove 188 and the base wall 175.

An opening portion 162' for the key switch body is provided on both of the front walls 184, 186 of the respective covers 154', 155'. A transmissible operating portion (i.e. displaying portion) 166' of the key switch body 156' projects forward from the opening portion 16'. A transmissible small width portion 179 being narrower than the operating portion 166' is formed integrally with the operating portion 166' behind it. An engaging portion 167' to be a non-transmissible portion 183 and an outwardly-facing collar portion 164' are integrally molded at the periphery of the small width portion 179. The collar portion 164' spreads outer than the operating portion 166', and the front of the collar portion 164' is positioned on the same plane as a step portion 178 between the operating portion 166' and the small width portion 179

The engaging portion 167' of the key switch body 156' is inserted in the opening portion 159' of the sealing rubber 157'. The inwardly-facing collar portion 170' of the sealing rubber 157' abuts against the back of the outwardly-facing collar portion 164' of the key switch body 156', and the key switch body 156' is pushed forward (i.e. in an arrow D1 direction) by elasticity of the sloping portion 169' of the sealing rubber 157', whereby the collar portion 164' of the key switch body 156' coheres to the back of the sub-cover 155', the front of the collar portion 170' of the sealing rubber 157' coheres to the back of the collar portion 164' of the key switch body 156' strongly elastically, and then inroad of water, dust, or the like to the inside of the key switch body 156' is prevented securely. The end of the collar portion 170' of the sealing rubber 157', namely the edge portion of the opening portion 159', coheres to the peripheral surface of the engaging portion 167' of the key switch body 156', whereby the water-and-dust proofing property is enhanced and simultaneously the key switch body 156' is positioned with respect to the display 176 precisely.

The display 176 is arranged facing the transmissible small width portion 179 of the key switch body 156' through a stroke-gap. The display 176 is provided on the control substrate 177. The periphery 158a' of the opening portion 171' of the base wall 158' of the display case 175 abuts against the periphery of the front of the display 176, and the peripheral wall 190 of the display case 175 abuts against the control substrate 177.

When the key switch body 156' is pushed, a gap arises between the collar portion 164' of the key switch body 156' and the sub-cover 155'. As described above, however, because the base portion 168' of the sealing rubber 157' coheres to the base wall 158' of the display case 175, even if water, dust, or the like enter the sub-cover 155' from the gap, they do not reach the display 176.

Here, as described above, a transparent electrode substrate (i.e. such as reference characters 10 and 11 of FIG. 2) may be arranged on the front of the display 176, and a transparent electrode (i.e. such as reference character 43 of FIG. 4) may be arranged on the key switch body 156'.

The switch module 160' is assembled as follows: first of all, the engaging portion 167' of the key switch body 156' is inserted into the opening portion 159' of the sealing rubber 157'; the sub-cover 155' is put on; the base portion 168' of the sealing rubber 157' is pressed on the base wall 158' of the display case 175 by the front end portion of the peripheral wall 187 of the sub-cover 155'; and the collar portion 164' of the key switch body 156' is pressed down against reaction force of the sealing rubber 157' by the front wall 186 of the sub-cover 155'. In this state, the sloping portion 169' of the sealing rubber 157' bends a little in a switch-pushing direction. Even when the key switch body 156' is pushed, the collar portion 170' of the sealing rubber 157' and the collar portion 164' of the key switch body 156' coheres each other without a gap by means of reaction force of the sealing rubber 157', whereby good sealing is exhibited.

And, because size of the opening portion 159' of the sealing rubber 157' is smaller than outside dimension of the engaging portion 167' of the key switch body 156', the peripheral surface of the engaging portion 167' is pushed by the end of the collar portion 170' of the opening portion 159', thereby exhibiting good sealing.

And, because the waterproof structure is obtained with simple work of pressing the sub-cover 155' by the sealing rubber 157' after inserting the key switch body 156' into the opening portion 159' of the sealing rubber 157', a major device and work of integrally molding or gluing the sealing rubber 157' to the key switch body 156' are not required, thereby reducing parts cost and manufacturing cost.

Also, visibility from an oblique direction is superior because the operating portion 166' of the key switch body 156' is larger than the small width portion 179. And, the collar portion 170' of the sealing rubber 157' is arranged on a side of the small width portion 179, the switch gets compacted. And, because the collar portion 170' seals the small engaging portion 167', the adhering area can be small, thereby raising sealing characteristic.

Further, because the engaging portion 167' and the collar portion 164' of the key switch body 156' are in non-transmissible black, transmission of indication of the neighboring operating portion 166' on the display 176 is prevented and light leak from a gap with the opening portion 162' and the operating portion 166' of the cover 154' is prevented.

Figure 18:
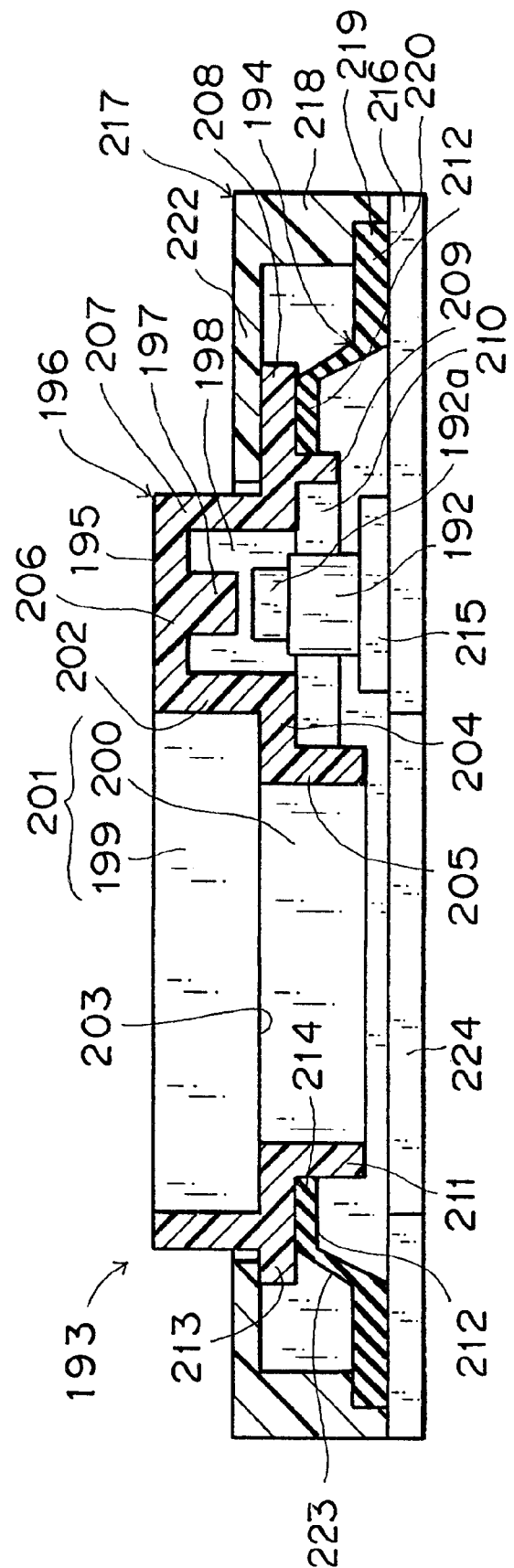
FIG. 18 is a longitudinal sectional view showing another example corresponding to a push switch.
Figure 19:
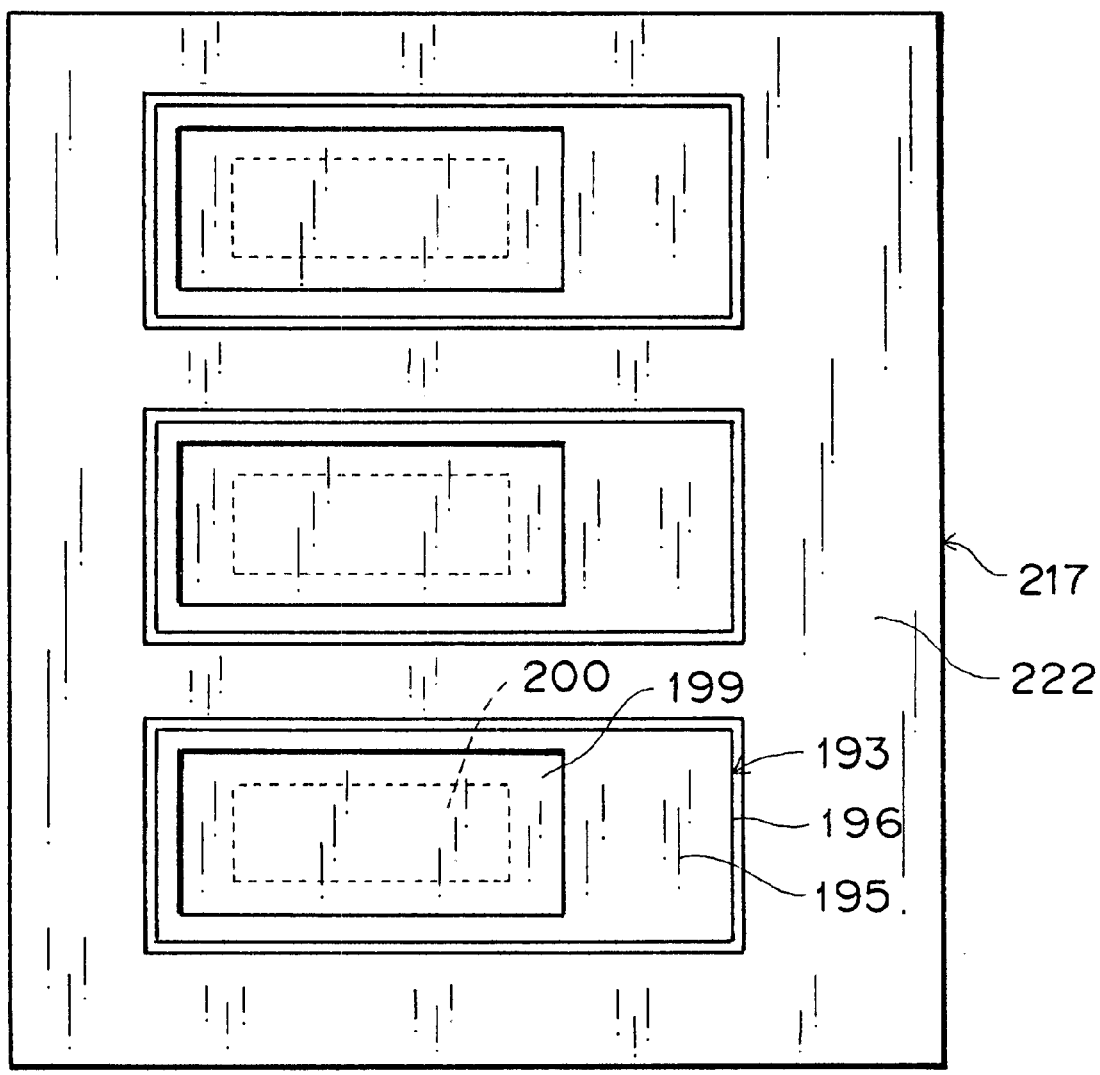
FIG. 19 is a plan view showing the example of FIG. 18.
Figure 20:
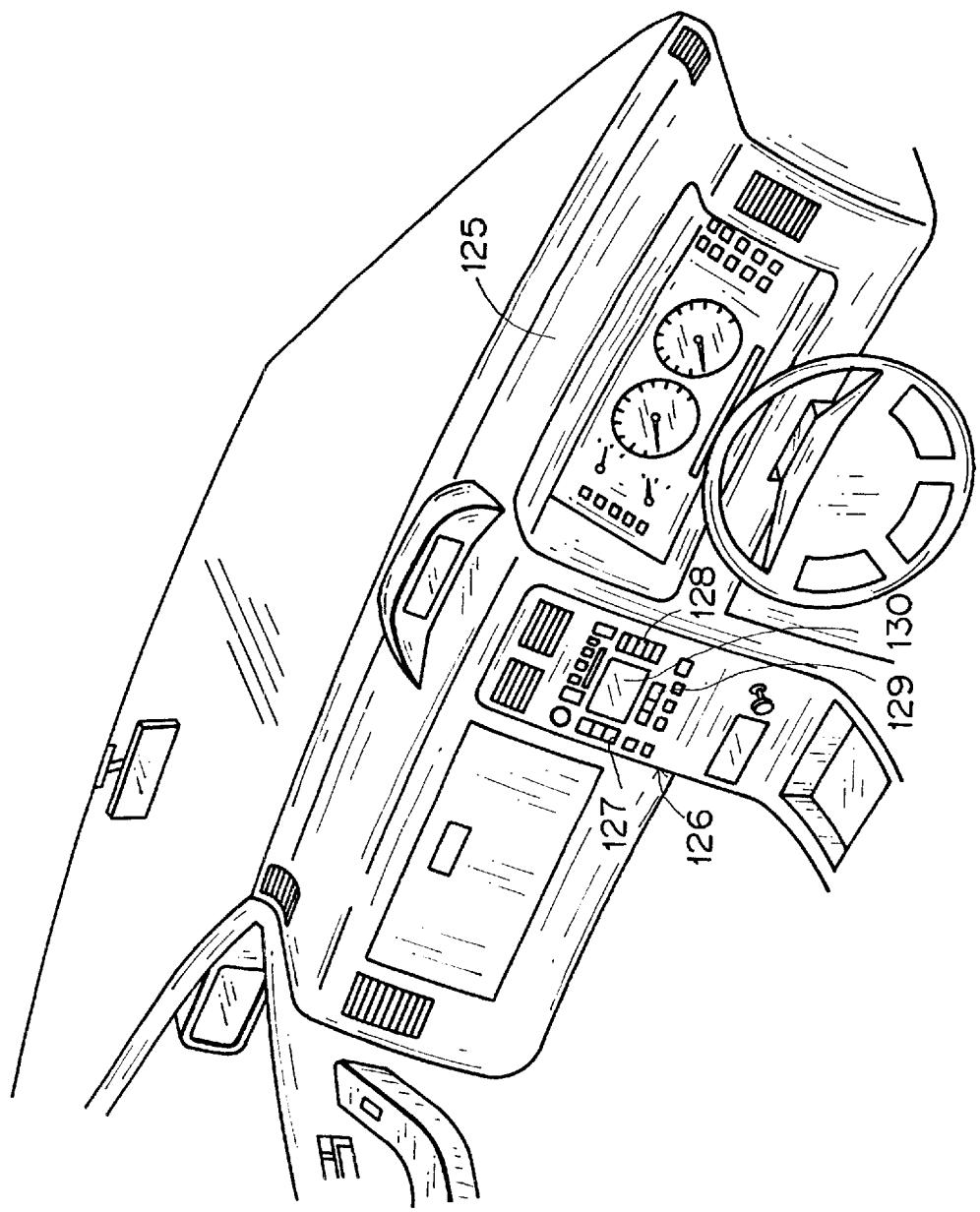
FIG. 20 is a perspective view showing an arrangement of a key switch body, a display, and the like in a motor vehicle.
Figure 21:
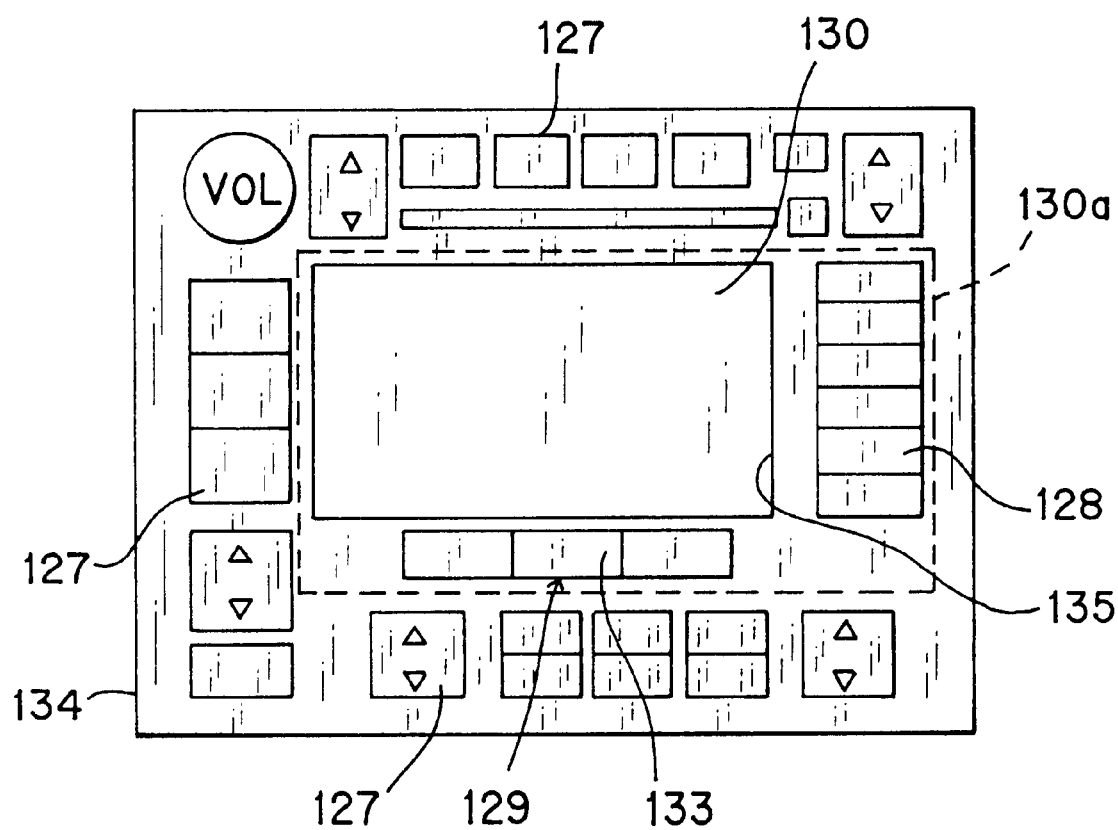
FIG. 21 is a front view showing a conventional push switch structure.
Figure 22:
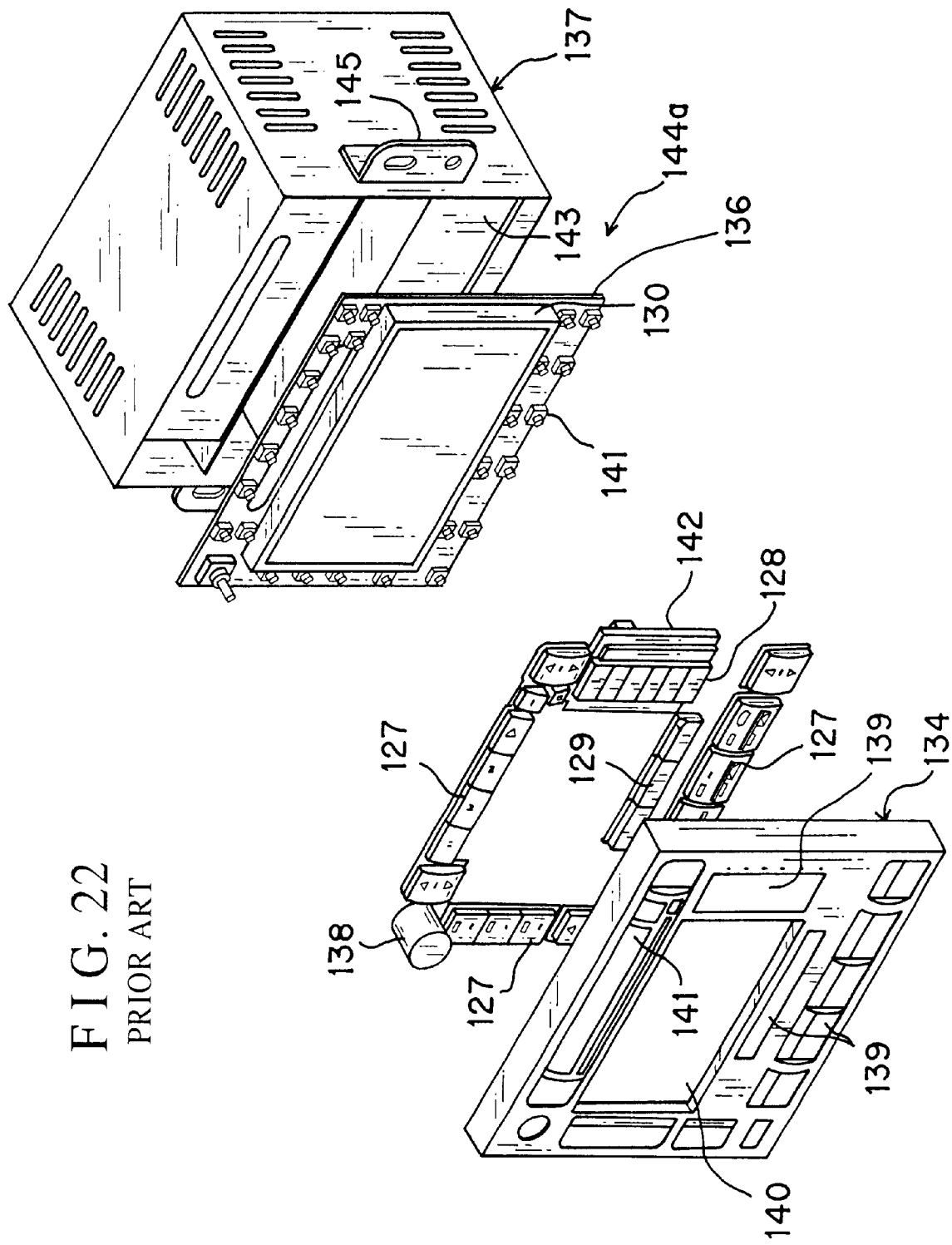
FIG. 22 is a perspective view showing the push switch structure of FIG. 21.
Figure 23:
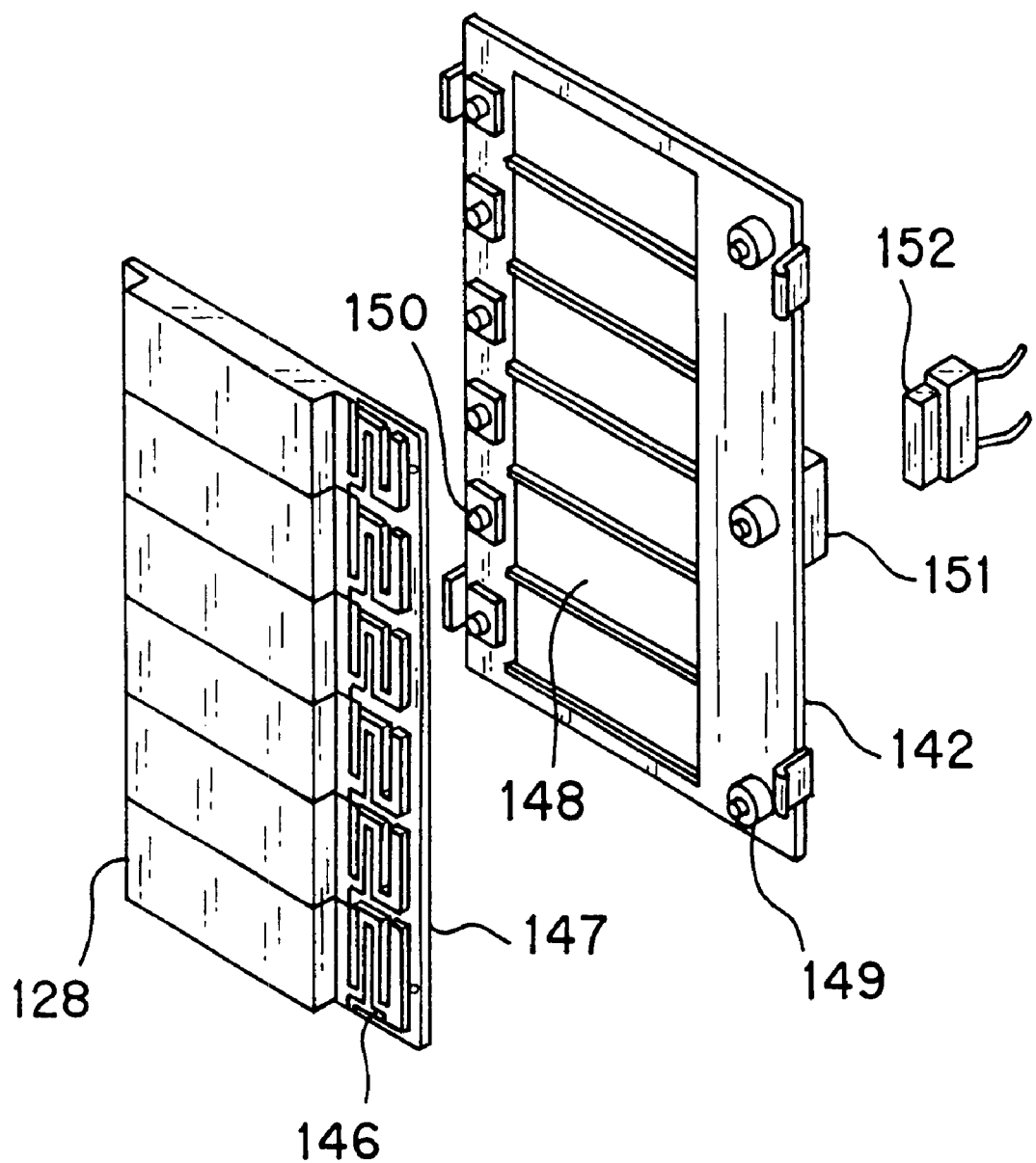
FIG. 23 is a perspective view showing a main portion of the push switch structure of FIG. 21.

FIGS. 18 and 19 show another example in the third embodiment of the push switch structure, wherein a push-button switch 192 is accommodated inside a key switch body 193.

Because material of component and an adherence structure with a sealing rubber (i.e. elastic sealing member) 194 and the key switch body 193 are similar to the example of FIG. 17 basically, detailed description is omitted.

Referring to FIG. 18, an accommodating recess 196 for the push-button switch 192 is formed in a non-transmissible portion 195 of the key switch body 193, and a projecting portion 197 to push an operating portion 192a of the push-button switch 192 is formed in the accommodating recess 196. The push-button switch 192 is positioned in a space 198 in the accommodating recess 196. The accommodating recess 196 is formed on one end side of the rectangular key switch body 193 (cf. FIG. 19).

A non-transmissible portion 195 is integrally molded over both of the circumferences of a displaying portion (wide portion) 199 to be a transmissible portion 201 and a small width portion 200. The accommodating recess 196 continues to one end side of the transmissible portion 201. And, the accommodating recess 196 has a first portion 202 positioned outside the displaying portion 199, a second portion 204 along a step portion 203 between the small width portion 200 and the displaying portion 199 orthogonally to the first portion 202, a third portion 205 along the periphery of the small width portion 200 orthogonally to the second portion 204, a fourth portion (i.e. operating portion) 206 to form a plane same as the displaying portion 199 orthogonally to the first portion 202, and a fifth portion 207 being parallel to the first portion 202 orthogonally to the fourth portion 206.

An inside width between the fifth portion 207 and the first portion 202 is larger than the outside diameter (the outer width) of the push-button switch 192. The third portion 205 is positioned deeper than the push-button switch 192. The above-described pushing projecting portion 197 is formed integrally with the fourth portion 206 in the back. An outwardly-facing collar portion 208 is formed orthogonally to the fifth portion 207, and a short engaging portion 209 projects orthogonally from the back of the collar portion 208.

According to this structure, because the push-button switch 192 is accommodated within a thickness of the transmissible portion 201, thin-modeling of the present switch structure is attained.

The engaging portion 209 extends in a width direction of the key switch body 193 of FIG. 19, and crosses at right angles to a longitudinal engaging portion 210 (FIG. 18) of the key switch body 193. The engaging portion 210 continues to another engaging portion 211. A projecting length of the engaging portion 209 is shorter than a projecting length of the engaging portion 211 and is larger than a thickness of an inwardly-facing collar portion 212 of the sealing rubber 194. The engaging portions 209–211 continue to the circumference of the key switch body 193.

An outwardly-facing collar portion 213 continues orthogonally to the engaging portion 211 with the same surface as the step portion 203 on the other end of the transmissible portion 201. The collar portion 208, 213 continue over the circumference of the key switch body 193. The collar portion 212 of the sealing rubber 194 coheres to the engaging portions 209–211 and the collar portions 208, 213 elastically. The collar portion 212 continues over the circumference of the opening portion 214.

The above push-button switch 192 is arranged on a narrow substrate 215, and the substrate 215 is fixed to the base member 216. A base portion 220 of the sealing rubber 194 is fixed between a groove 219 of a peripheral wall 218 of a front cover 217 and the front of the base member 216. A front wall 222 of the front cover 217 pushes the collar portions 208, 213 of the key switch body 196 toward the collar portion 212 of the sealing rubber 194. The collar portions 208, 213, 212 cohere by reaction force of a sloping portion 223 of the sealing rubber 194. And, the inner surface of the collar portion 212 of the sealing rubber 194, namely the inner surface of the opening portion 214, coheres to the peripheral surface of the engaging portions 209–211.

A display (not illustrated) or a mirror reflecting the display is arranged facing an opening portion 224 of the base member 216. Like the example of FIG. 17, the base member 216 and the display case (reference character 175 of FIG. 17) may be integrally formed. In this example, the key switch body 196 and the sealing rubber 194 are pressed down only with the front cover 217 without using the sub-cover (reference character 155' of FIG. 17).

Various structures in the first and the second embodiments may also be applied to the third embodiment as follows. For example, the sealing rubber 194 (FIG. 18) is formed in a sector-shape between the key switch bodies 193 (FIG. 19) and the resilient portion (reference character 114 of FIG. 14) is formed by bending the sector portion (reference character 116 of FIG. 15). Or, the transparent electrode substrate (reference character 10 of FIG. 3) is arranged on the display 176 in FIG. 17, and the key switch body 156' (FIG. 17) is provided with the transparent electrode (reference character 43 of FIG. 4) for the transparent electrode substrate. Or, the base portion 168' of the sealing rubber 157' (FIG. 17) coheres to the transparent electrode substrate (reference character 10 of FIG. 3). An assembled unit of the sealing rubber 194 and the key switch body 193 (FIG. 18) is assembled to the display case (reference character 77 of FIG. 9), and the display case is assembled to an assembly of the control substrate (reference character 79 of FIG. 9) and the display (reference character 78 of FIG. 9). The base portion 220 of the sealing rubber 194 (FIG. 18) coheres to the front of the accommodating portion (reference character 87 of FIG. 9) of the display case (reference character 77 of FIG. 9), and the display (reference character 78 of FIG. 9) is put into close contact with the backside of the accommodating portion. A desiccant is set inside the display case 175 (FIG. 17).

What is claimed is:

1. A push switch structure of a display, comprising:
   an electrode substrate being capable of passing light therethrough and arranged on a surface of said display;
   a key switch body having a transmissible portion for transmitting indication of the display when said key switch body is pushed, said key switch being arranged above said electrode substrate; and
   an elastic sealing member adhering to a circumference of the key switch body, a base portion of the elastic sealing member cohering to said electrode substrate, so as to seal the key switch body and supporting the key switch body such that there is a space provided between the key switch body and the electrode substrate when the key switch body is in a non-pushed state, wherein the elastic sealing member is deformed in a pushed-state of the key switch body and resiles in the non-pushed state thereof thereby to form the space.

2. The push switch structure as set forth in claim 1, wherein the key switch body has a transmissible portion and a non-transmissible portion, and an elastic contact which electrically contacts the electrode substrate is provided inside the non-transmissible portion.

3. The push switch structure as set forth in claim 2, wherein the elastic contact is provided inside one non-transmissible portion of the key switch body, and a hinge is provided inside the other non-transmissible portion of the key switch body.

4. The push switch structure as set forth in claim 2, wherein the non-transmissible portion is formed with the elastic sealing member, and the elastic sealing member is supported by the elastic contact.

5. The push switch structure as set forth in claim 1, wherein the electrode substrate is a transparent electrode substrate, and a transparent electrode to be electrically connected with the transparent electrode substrate is provided on the key switch body.

6. A push switch structure for a display, comprising:

a key switch body having a transmissible portion for transmitting indication of the display when said key switch body is pushed and having a collar portion;

an elastic sealing member having an opening portion to receive the key switch body and supporting the key switch body such that there is a space provided between the key switch body and the display when the key switch body is in a non-pushed state; and a cover to push the collar portion of the key switch body toward the elastic sealing member so that the collar portion coheres to the elastic sealing member, wherein the elastic sealing member has a collar portion around the opening portion and the collar portion of the key switch body coheres to the collar portion of the elastic sealing member.

7. The push switch structure as set forth in claim 6, wherein the key switch body coheres to an inner surface of the opening portion.

8. The push switch structure as set forth in claim 6, wherein the key switch body has a displaying portion and an engaging portion formed narrower than the displaying portion, the engaging portion being inserted into the opening portion of the elastic sealing member.

9. The push switch structure as set forth in claim 6, further comprising:

a base member to be arranged between the elastic sealing member and the display, wherein a peripheral portion of the elastic sealing member is tightly put between the cover and the base member.

10. The push switch structure as set forth in claim 6, further comprising:

a push-button switch, wherein an accommodating recess for accommodating the push-button switch is provided on the key switch body.

11. The push switch structure as set forth in claim 10, wherein the key switch body has a displaying portion and an engaging portion, the engaging portion being inserted into the opening portion of the elastic sealing member and being formed to cover a circumference of the displaying portion and the accommodating recess.

12. The push switch structure as set forth in claim 11, wherein the collar portion, the engaging portion, and the accommodating recess are made of a non-transmissible material.

13. The push switch structure as set forth in claim 6, wherein a transparent electrode substrate is arranged on a surface of the display and a transparent electrode to be electrically connected with the transparent electrode substrate is provided on the key switch body.

14. The push switch structure as set forth in claim 13, wherein a base portion of the elastic sealing member coheres to the transparent electrode substrate.

15. A push switch structure of a display, comprising:

a key switch body having a transmissible portion for transmitting indication of the display when said key switch body is pushed;

an elastic sealing member adhering to a circumference of the key switch body so as to seal the key switch body and supporting the key switch body such that there is a space provided between the key switch body and the display when the key switch body is in a non-pushed state;

a display case to mount an assembled unit of the elastic sealing member and the key switch body; and a control substrate to mount the display, wherein a sector portion is provided on the elastic sealing member between the key switch bodies and a resilient portion is formed by bending the sector portion so that the elastic sealing member is deformed in a pushed-state of the key switch body and resiles in the non-pushed state thereof thereby to form the space, the display case is mounted onto an assembly of the control substrate and the display, and the display case has an accommodating portion for accommodating the assembled unit, and the base portion of the elastic sealing member coheres to a front of the accommodating portion and the display coheres to a back of the accommodating portion.

16. The push switch structure as set forth in claim 6, further comprising:

a display case to mount an assembled unit of the elastic sealing member and the key switch body; and a control substrate to mount the display, wherein the display case is mounted onto an assembly of the control substrate and the display.

17. The push switch structure as set forth in claim 15 or claim 16, wherein a desiccant is provided inside the display case.

* * * * *